United States Patent
Guo et al.

(10) Patent No.: US 12,443,569 B2
(45) Date of Patent: *Oct. 14, 2025

(54) SYSTEMS AND METHODS FOR SELECTING AND UTILIZING A COMMITTEE OF VALIDATOR NODES IN A DISTRIBUTED SYSTEM

(71) Applicant: Cypherium Blockchain Inc., New York, NY (US)

(72) Inventors: Yangrui Guo, Long Island City, NY (US); Qiandong Yang, Shenzhen (CN); Hui Zhou, Hong Kong (CN); Weiqiang Lu, Shenzhen (CN); Sheng Zeng, Shenzhen (CN); Liang Yang, Shenzen (CN); Sicong Zhuang, Shenzhen (CN)

(73) Assignee: Cypherium Blockchain Inc., New York, NY (US)

( * ) Notice: Subject to any disclaimer, the term of this patent is extended or adjusted under 35 U.S.C. 154(b) by 283 days.

This patent is subject to a terminal disclaimer.

(21) Appl. No.: 17/884,277

(22) Filed: Aug. 9, 2022

(65) Prior Publication Data

US 2022/0385460 A1 Dec. 1, 2022

Related U.S. Application Data

(63) Continuation of application No. 16/591,604, filed on Oct. 2, 2019, now Pat. No. 11,411,721.

(Continued)

(51) Int. Cl.
*G06F 16/182* (2019.01)
*G06F 16/00* (2019.01)
(Continued)

(52) U.S. Cl.
CPC ......... *G06F 16/1837* (2019.01); *G06F 16/00* (2019.01); *G06Q 20/223* (2013.01);
(Continued)

(58) Field of Classification Search
CPC .......... G06F 16/1837; G06Q 20/38215; G06Q 20/401; H04L 9/00; H04L 9/0637;
(Continued)

(56) References Cited

U.S. PATENT DOCUMENTS

| | | |
|---|---|---|
| 8,607,066 B1 | 12/2013 | Kailash et al. |
| 9,608,829 B2 | 3/2017 | Spanos et al. |

(Continued)

FOREIGN PATENT DOCUMENTS

| | | | |
|---|---|---|---|
| CN | 101378592 A | * | 3/2009 |
| CN | 102571880 A | * | 7/2012 |

(Continued)

OTHER PUBLICATIONS

Amsden, Zachary et al., The Libra Blockchain, Revised Jul. 23, 2019, pp. 1-29; https://developers.libra.org/docs/assets/papers/the-libra-blockchain.pdf.

(Continued)

*Primary Examiner* — Sher A Khan
(74) *Attorney, Agent, or Firm* — Miller & Martin PLLC

(57) ABSTRACT

A distributed transaction system is provided including a group of validator nodes that are known to each other in a network but are indistinguishable to other network nodes. The validator nodes form a Committee including a Leader node and one or more Associate nodes configured to receive and process transaction requests, for example, to add new blocks to one or more blockchains. The Committee may be dynamically changed, such that new network nodes may be added to the Committee or may replace existing validator nodes. The Associate nodes also may coordinate with each other to select a new Leader node. The validator nodes in the Committee may be changed at a sufficient frequency to remove unreliable, unavailable, or otherwise untrusted nodes.

20 Claims, 14 Drawing Sheets

Related U.S. Application Data

(60) Provisional application No. 62/907,412, filed on Sep. 27, 2019.

(51) Int. Cl.

| | | |
|---|---|---|
| *G06Q 20/22* | (2012.01) | |
| *G06Q 20/38* | (2012.01) | |
| *G06Q 20/40* | (2012.01) | |
| *H04L 9/00* | (2022.01) | |
| *H04L 9/06* | (2006.01) | |
| *H04L 9/08* | (2006.01) | |
| *H04L 9/30* | (2006.01) | |
| *H04L 9/32* | (2006.01) | |
| *H04L 67/00* | (2022.01) | |
| *H04L 67/104* | (2022.01) | |
| *G06F 16/27* | (2019.01) | |
| *G06Q 20/02* | (2012.01) | |
| *G06Q 20/06* | (2012.01) | |
| *G06Q 20/36* | (2012.01) | |
| *H04L 9/40* | (2022.01) | |

(52) U.S. Cl.
CPC ... *G06Q 20/38215* (2013.01); *G06Q 20/3825* (2013.01); *G06Q 20/3827* (2013.01); *G06Q 20/3829* (2013.01); *G06Q 20/389* (2013.01); *G06Q 20/401* (2013.01); *H04L 9/00* (2013.01); *H04L 9/0637* (2013.01); *H04L 9/0643* (2013.01); *H04L 9/0836* (2013.01); *H04L 9/30* (2013.01); *H04L 9/3247* (2013.01); *H04L 9/3255* (2013.01); *H04L 9/3265* (2013.01); *H04L 9/3297* (2013.01); *H04L 67/00* (2013.01); *H04L 67/1051* (2013.01); *G06F 16/27* (2019.01); *G06Q 20/02* (2013.01); *G06Q 20/065* (2013.01); *G06Q 20/3678* (2013.01); *G06Q 20/4016* (2013.01); *H04L 9/3239* (2013.01); *H04L 9/50* (2022.05); *H04L 63/123* (2013.01)

(58) Field of Classification Search
CPC ....... H04L 9/0643; H04L 9/0836; H04L 9/30; H04L 9/3247; H04L 9/3255; H04L 9/3265; H04L 9/3297; H04L 9/3239; H04L 9/50; H04L 63/123
See application file for complete search history.

(56) References Cited

U.S. PATENT DOCUMENTS

| | | | |
|---|---|---|---|
| 10,158,527 | B2 | 12/2018 | Anderson et al. |
| 10,666,778 | B1 | 5/2020 | Yang |
| 11,196,573 | B2* | 12/2021 | Roennow ............ H04L 63/0435 |
| 11,403,622 | B2* | 8/2022 | Fletcher ................ H04L 9/0825 |
| 11,516,006 | B2 | 11/2022 | Guo et al. |
| 2001/0016911 | A1 | 8/2001 | Obana |
| 2009/0193256 | A1 | 7/2009 | Takenaka et al. |
| 2009/0210715 | A1* | 8/2009 | Izu .......................... G06F 21/64 |
| | | | 713/176 |
| 2014/0040898 | A1 | 2/2014 | Karp et al. |
| 2014/0143205 | A1 | 5/2014 | Leshchiner et al. |
| 2015/0161368 | A1 | 6/2015 | Stewart et al. |
| 2015/0310054 | A1 | 10/2015 | Passey et al. |
| 2017/0201590 | A1 | 7/2017 | Wojciechowski et al. |
| 2018/0101560 | A1 | 4/2018 | Christidis et al. |
| 2018/0109541 | A1* | 4/2018 | Gleichauf ............. H04W 12/06 |
| 2018/0115413 | A1* | 4/2018 | King ......................... H04L 9/30 |
| 2018/0121909 | A1 | 5/2018 | Christidis et al. |
| 2018/0123882 | A1 | 5/2018 | Anderson et al. |
| 2018/0150835 | A1* | 5/2018 | Hunt .................. G06Q 20/3827 |
| 2018/0157558 | A1 | 6/2018 | Karame et al. |
| 2018/0219945 | A1* | 8/2018 | Soni .................... H04L 67/1097 |
| 2018/0337882 | A1* | 11/2018 | Li ...................... G06Q 20/3825 |
| 2019/0081796 | A1 | 3/2019 | Chow et al. |
| 2019/0149338 | A1 | 5/2019 | Byrne |
| 2019/0266178 | A1 | 8/2019 | Madhavan et al. |
| 2019/0278944 | A1* | 9/2019 | Cheng ................ G06F 21/6236 |
| 2019/0354518 | A1* | 11/2019 | Zochowski ......... G06F 16/2379 |
| 2019/0370793 | A1* | 12/2019 | Zhu ........................... H04L 9/50 |
| 2020/0004643 | A1 | 1/2020 | Yang |
| 2020/0013027 | A1 | 1/2020 | Zhu |
| 2020/0019616 | A1 | 1/2020 | Sukhija et al. |
| 2020/0026699 | A1 | 1/2020 | Zhang et al. |
| 2020/0052880 | A1 | 2/2020 | Bathen et al. |
| 2020/0052917 | A1 | 2/2020 | Corral et al. |
| 2020/0082126 | A1* | 3/2020 | Brown ................. G06Q 20/401 |
| 2020/0104293 | A1 | 4/2020 | Shi et al. |
| 2020/0127835 | A1* | 4/2020 | Fletcher ............... H04L 9/3066 |
| 2020/0162261 | A1 | 5/2020 | Iyer |
| 2020/0162264 | A1 | 5/2020 | Zamani et al. |
| 2020/0183951 | A1 | 6/2020 | Mittal et al. |
| 2020/0204351 | A1 | 6/2020 | Chen et al. |
| 2020/0234386 | A1* | 7/2020 | Blackman ................ H04L 9/30 |
| 2020/0304289 | A1 | 9/2020 | Androulaki et al. |
| 2020/0313856 | A1* | 10/2020 | Basu ..................... H04L 9/3073 |
| 2020/0394159 | A1* | 12/2020 | Hurley ................. G06Q 20/389 |
| 2020/0394648 | A1 | 12/2020 | Blackshear et al. |
| 2020/0396072 | A1 | 12/2020 | Maurer et al. |
| 2021/0004777 | A1 | 1/2021 | Kim et al. |
| 2021/0026745 | A1 | 1/2021 | Wang |
| 2021/0083882 | A1 | 3/2021 | Venable, Sr. |
| 2021/0099312 | A1* | 4/2021 | Guo ..................... G06F 16/1837 |

FOREIGN PATENT DOCUMENTS

| | | | | |
|---|---|---|---|---|
| CN | 102930364 | A * | 2/2013 | |
| CN | 104038397 | A * | 9/2014 | |
| CN | 107017993 | A * | 8/2017 | ........... H04L 9/0861 |
| CN | 107171829 | A | 9/2017 | |
| CN | 107864037 | A * | 3/2018 | |
| CN | 108965469 | A | 12/2018 | |
| CN | 109039748 | A | 12/2018 | |
| CN | 110189128 | A * | 8/2019 | ........... G06Q 20/065 |
| CN | 110971414 | B | 5/2021 | |
| EP | 3721582 | B1 * | 1/2023 | ......... H04L 63/0428 |
| WO | WO-9639765 | A1 * | 12/1996 | ............. G06F 21/40 |
| WO | 0049768 | A1 | 8/2000 | |
| WO | 2015118160 | A1 | 8/2015 | |
| WO | WO-2017194976 | A1 * | 11/2017 | ........... G06Q 10/087 |
| WO | WO-2018073482 | A1 * | 4/2018 | ............. H04L 63/10 |
| WO | WO-2018112805 | A1 * | 6/2018 | ........ H04L 67/1044 |
| WO | WO-2018163031 | A1 * | 9/2018 | ......... H04L 63/0428 |
| WO | 2019091289 | A1 | 5/2019 | |
| WO | 2019/137282 | A1 | 7/2019 | |
| WO | 2020/254923 | A1 | 12/2020 | |

OTHER PUBLICATIONS

Lamport, Leslie et al., The Byzantine Generals Problem, AMCM Transactions on Programming Language and Systems, vol. 4, No. 3, Jul. 1982, pp. 382-401.
Syta, Ewa et al., Keeping Authorities "Honest or Bust" with Decentralized Witness Cosigning, arXiv:1503.08768v.4 [cs.CR] May 30, 2016, 20 pages.
Yin, Maofan et al., HotStuff: BFT Consensus in the Lens of Blockchain, arXiv:1803.05069v6 [cs.DC] Jul. 23, 2019, pp. 1-23.
Eyal, Ittay et al., "Bitcoin-NG: A Scalable Blockchain Protocol," 13th USENIX Symposium on Networked System Design and Implementation (NSDI '16), pp. 45-59 (2016).
Amsden, "The Libra Blockchain" (Year: 2020).
Bano, "SoK: Consensus in the Age of Blockchains," arXiv:1711.03936v2 [cs. CR] Nov. 14, 2017, pp. 1-17. (Year: 2017).
bit2me.com, "What is Signature Aggregation or Signature Aggregation" (Year: 2022).
Castro, "Practical Byzantine Fault Tolerance" (Year: 1999).
Eyal, "Bitcoin-NG: A Scalable Blockchain Protocol" (Year: 2015).
Guo, "Cypherium: A Scalable and Permissionless Smart Contract Platform" White Paper Draft v1.0 (undated).

(56) References Cited

OTHER PUBLICATIONS

Guo, "Cypherium: A Scalable and Permissionless Smart Contract Platform" White Paper Draft v1.1 (undated).
Jalalzai, "Fast-Hotstuff: A Fast and Robust BFT Protocol for Blockchains," https://www.youtube.com/watch?v=AVGD_AWf47g (Year: 2022).
Sheff, "Serializability and Heterogeneous Trust from Two Phase Commit to Blockchains" (Year: 2019).
Sync, "Hotstuff Simple and Practical Synchronous State Machine Replication," https://youtube.com/watch?v=mEWrrdP4kGE (Year: 2022).
Wan, "Goshawk: A novel Efficient, Robust and Flexible Blockchain Protocol" (Year: 2018).
Yaga, "Blockchain Technology Overview," Oct. 2018 (Year: 2018).
Yin, "Hotstuff: BFT Consensus with Linearity and Responsiveness" (Year: 2019).
Yin, et al. "Hotstuff: BFT Consensus in the Lens of Blockchain" (Year: 2019).
ZK-TLV 0x09—Ittai Abraham—The Hotstuff approach to BFT (Part 3), https:www.youtube.com/watch?v=ONobl3X70Rc (Year: 2022).

* cited by examiner

SYSTEMS AND METHODS FOR SELECTING AND UTILIZING A COMMITTEE OF VALIDATOR NODES IN A DISTRIBUTED SYSTEM

FIELD OF THE INVENTION

The disclosed embodiments relate to distributed transaction-based systems and, more particularly, systems and methods for selecting and utilizing a group of validator nodes that may be used to verify and record transactions for one or more blockchains in a distributed system.

BACKGROUND OF THE INVENTION

A network is a collection of interconnected nodes that exchange information. The nodes can include computers, servers, mobile devices, or any other device that can be configured to communicate with other nodes in the network. The network may be configured as a centralized system, such as a client-server system having one or more central servers in communication with one or more client devices, or may be configured as a decentralized system, such as a peer-to-peer (P2P) network. A P2P network is a system in which each network node, sometimes called a "peer," may be directly connected to one or more other nodes in the network. Peers typically have similar privileges and may share a portion of their resources with other peers in the network without coordination by any centralized servers or hosts. P2P networks have been implemented using various technologies, including for example file-sharing systems, such as Napster. and blockchain technologies, such as Bitcoin.

A transaction-based system is a system that processes data in units of "transactions." which may have different contents, formats, or other characteristics depending on the system. An example of a conventional transaction-based system is Sabre, which is a system used by travel agents and companies to process transactions that are used to book airline tickets. A transaction may be a message, event, or process initiated or invoked by a user or computer program, and may provide a single unit of work in the system. For example, a transaction may contain data corresponding to an electronic funds transfer between different bank accounts. A transaction could also correspond to an event when two or more parties enter into an agreement, such as a legal contract. In this example, the action of entering into the agreement is processed and recorded as a single transaction, and the transaction data may correspond to the agreement itself and/or any other information relating to the agreement. In another example, each transaction may correspond to the identity of the party or parties that have signed an agreement, in which case the signing of the agreement by each party is processed and recorded as one transaction. A transaction, alone or combined with other transactions, may be represented or transmitted as a unit of data. In a Bitcoin setting, a transaction usually is defined as the transfer of a certain amount of Bitcoin cryptocurrency from one Bitcoin account to another.

To facilitate a demand for higher speed processing and convenience in transaction-based systems, some transaction-based systems have been built on network infrastructures. Originally and conventionally, such systems have been implemented in centralized networks: all of the transactions were processed by centralized servers and the related transaction data was stored in centralized databases. The system reliability thus depended solely on the reliability of the centralized system. A failure of the centralized server could cause catastrophic results to the transaction-based system.

A decentralized transaction-based system, sometimes referred to as a distributed transaction-based system, is desirable because the system depends less on centralized servers and, thus, may be more reliable. Implementing such a distributed system on a P2P network is often preferred because the necessity of using a centralized host server is eliminated and the system is reliable until many network nodes fail at the same time, which is typically unlikely. However, implementing such a distributed transaction-based system is challenging because the lack of a centralized host may result in complicated and dynamic component interdependencies. Several critical issues must be solved: for example, how is transaction data organized and stored in the system; how is a consensus reached by the network nodes to confirm or reject a new transaction request; and how are network nodes in the system authenticated and/or their authentication verified.

Unlike in a centralized system, data in a distributed P2P system may be stored as many copies, for example, by one or more of the network nodes. For example, each node may have a copy of the entire data set in a transaction-based system or it may store only a portion of the data. Many schemes have been designed to ensure that each network node may effectively store and verify the system data through cooperation with the other nodes.

One exemplary scheme uses blockchain technology, which is widely known as the technology behind the popular cryptocurrency Bitcoin. In a blockchain scheme, transaction data can be organized into discrete "blocks." each of which may be linked with a predecessor ("parent") block by storing a cryptographic hash value of the parent block, or by using other techniques such as using hash values and/or digital signatures of one or more preceding blocks. The contents in each block can be verified against its cryptographic hash value stored in a subsequent adjacent ("child") block. Therefore, once the accuracy of the current block of the blockchain is verified, a network node can verify every preceding block contained in the blockchain without having to contact any of the other nodes.

The Bitcoin system is one of the most well-known implementations of blockchain technologies in distributed transaction-based systems. In Bitcoin, each network node competes for the privilege of storing a set of one or more transactions in a new block of the blockchain by solving a complex computational math problem, sometimes referred to as a mining proof-of-work (POW). Under current conditions, a set of transactions is typically stored in a new block of the Bitcoin blockchain at a rate of about one new block every 10 minutes, and each block has an approximate size of one megabyte (MB). Accordingly, the Bitcoin system is subject to an impending scalability problem: only 3 to 7 transactions can be processed per second, which is far below the number of transactions processed in other transaction-based systems, such as the approximately 30000 transactions per second in the Visa™ transaction system.

Bitcoin-NG, or the Bitcoin Next Generation system, attempts to solve this scalability problem by introducing a network node in the P2P system that acts as a leader node that processes transactions and adds new blocks to the Bitcoin blockchain. This system includes two separate blockchains: a Transaction blockchain for storing the transaction data and a Keyblock blockchain for publishing a public key, which may be a temporary "epoch" public key assigned to the current leader node. In Bitcoin-NG, the Keyblock blocks are generated in the same way as transaction blocks are generated in the conventional Bitcoin network, except the Keyblock blocks contain only the public key that the leader node will use to sign new blocks added to the Transaction blockchain. Thus, the leader node is the node that generated the latest block in the Keyblock blockchain and that digitally signs new blocks added to the Transaction blockchain using a private key corresponding to its published epoch public key.

While Bitcoin-NG does solve conventional Bitcoin's scalability problem, as the leader node in Bitcoin-NG can process new transaction blocks more efficiently than using the POW approach of conventional Bitcoin, it somewhat reverts Bitcoin from a distributed system to a system by having a single leader node at any given time. As such, the reliability and the security of the Bitcoin-NG system depends, at least partially, on the reliability and security of that leader node. The failure of the leader node may cause a catastrophic failure of the system. The Bitcoin-NG system is described, for example, in the paper by Ittay Eyal et al., "Bitcoin-NG: A Scalable Blockchain Protocol," 13$^{th}$ USENIX Symposium on Networked System Design and Implementation (NSDI '16), pp. 45-59 (2016), which is incorporated by reference herein.

Another issue rooted in a conventional distributed system is the Byzantine fault problem, which addresses how a system of multiple nodes can reach a consensus for agreeing when to change the system's state. The Byzantine fault problem requires that nodes must agree on a concrete strategy to reach a consensus to avoid a system failure, even where some of the nodes may be unreliable. Castro et al., "Practical Byzantine Fault Tolerance," Proceedings of the Third Symposium on Operating System Design and Implementation, New Orleans, USA (February 1999), which is incorporated by reference herein, introduced a two-round peer-to-peer message exchange technique to achieve a consensus. Initially, a leader node sends a system state-transition request to each of the other nodes in the network. In the first round, each node communicates with each of the other nodes to confirm that enough nodes have received the state-transition request, and then the nodes validate the request after confirming a first threshold number of nodes received it. In the second round, each node communicates with each of the other nodes to confirm that a second threshold number of nodes were able to validate the request. If the second threshold is satisfied, the nodes finalize the requested system state-transition based on the second round of confirmation. Because each node communicates with each of the other nodes in the system to reach a consensus, such a system is referred as a mesh communication network. Because only a threshold number of nodes are required to reach a consensus, a fault tolerance that permits a certain number of faulty nodes can be achieved in the Practical Byzantine Fault Tolerance (PBFT) system. However, PBFT's solution is not efficient when the system is scaled up. The communication costs necessary to form a consensus in the mesh network increases exponentially as the number of nodes increases in the PBFT system, again resulting a scalability problem. Further, the identities of the nodes are known to other nodes in the network, exposing all the validator nodes to potential attacks from other nodes in or out of the network. Given the validator nodes in PBFT are not reconfigurable, the failure of sufficient number of validator nodes may also cause catastrophic failure of the system.

In the PBFT system, a "view" refers to a period of time that a node serves as the leader node. When a node in the PBFT system discovers that the leader node has failed, it broadcasts a request to each of the other nodes in the system to change the leader node, which is a "view change" request. When a node receives enough view-change requests, it first determines a new leader node based on predefined rules and sends a view-change confirmation to the new leader node. The next "view" starts when the new leader node receives enough view-change confirmations from the other nodes in the PBFT system.

As a recent development, "HotStuff" introduced a protocol that modifies the mesh communication network in the PBFT system, merging the view-change process with generation of transaction blocks, resulting a three-phase protocol. Because each node communicates all of its messages (and transactions) directly to the leader node instead of sending messages to the leader node via one or more other nodes, the communication complexity of the system is greatly reduced. However, even with such reduced communications, the HotStuff network still faces scalability issues. The number of nodes is limited to the capability of the leader node and, as the number of cosigners grows, the system slows because of the time and resources consumed while processing and waiting for digital signatures from all of the cosigners. In Hotstuff, transactions may require several known "cosigner" nodes in the network to digitally sign one or more transactions before they can be forwarded to the leader node. Further, the identity of the leader node is public to all of the nodes in the network. Thus, the leader may be subject to external attacks by malicious third parties and the reliability of the system decreases.

Another issue with conventional distributed transaction-based systems relates to authentication of the nodes using digital signatures. In a distributed system, for example, each node must confirm that each information it receives is actually originated from the node that appears to have sent the information. Digital signatures are typically used to verify the authenticity of the sender of the information. Conventionally, digital signatures require each node to store a pair of keys: a public key and a private key. Each node keeps its own private key confidential, and does not share it with other nodes in the network, whereas the node publishes its public key to all of the other nodes in the network. The node digitally signs information using its private key and the other nodes may verify the signature using the signer's public key, which must be made available by the signing node. However, as the number of nodes in the network grows, each being capable of digitally signing information communicated in the network, the communicated information may be accompanied with several different digital signatures. In this case, each node has to verify each digital signature individually, resulting in another bottleneck of scalability for the distributed system.

A multi-signature scheme can be implemented where a group of signers, each having their own cryptographic public/private key pair, collaboratively digitally sign a single message m. The resulting signature can be verified using a set of public keys corresponding to the signers or, in other multi-signature schemes, using a common public key.

In 2016, Syta et al introduced CoSi, a two-round communication protocol allowing a group of cosigners to collaboratively sign a message. CoSi scales existing cryptographic multi-signature methods to support thousands of witnesses via signature aggregation over communication trees. The CoSi protocol is described, for example, in the paper by Ewa Syta et al., "Keeping authorities 'honest or bust' with decentralized witness cosigning," 2016 IEEE Symposium on Security and Privacy, pp. 526-545 (May 2016), which is incorporated by reference herein.

SUMMARY OF THE INVENTION

The present invention overcomes disadvantages of the prior art by providing a distributed transaction system including a group of validator nodes that are known to each other in a network but are indistinguishable to the other network nodes in the network. As used herein, the group of validator nodes may be referred to as a "Committee" of validator nodes. In some embodiments, the system reconfigures one or more validator nodes in the Committee based on the results of proof-of-work (POW) challenges. According to some disclosed embodiments, a network node that is not already a validator node in the Committee may be added to the Committee if it successfully completes a POW challenge. In such an event, the network node may become a new validator node in the Committee, replacing an existing validator node. In alternative embodiments, a network node may become a new validator node in the Committee based on a proof-of-stake (POS) consensus. In yet another embodiment, a network node may become a new validator node in the Committee based on a proof-of-authority (POA) consensus. In other alternative embodiments, a network node may become a new validator node in the Committee based on a combination of any of POW, POA, and POS consensus.

In some disclosed embodiments, the new validator node replaces the oldest validator node in the Committee. In other embodiments, the new validator node replaces a validator node that has been determined to have gone off-line, become compromised (e.g., hacked), failed (e.g., due to hardware malfunction), or otherwise is unavailable or no longer trusted. In the disclosed embodiments, the distributed system assumes that for a fault-tolerance off nodes, the Committee includes at least 3f+1 validator nodes. Because the validator nodes in the Committee may be frequently replaced, for example, depending on the amount of time required to complete the POW challenges, it is difficult for malicious third parties to detect the complete set of validator nodes in the Committee at any given time.

In accordance with some disclosed embodiments, the validator nodes in the Committee may receive transaction requests from other network nodes, for example, in a P2P network. The Committee may include at least one validator node that serves as a "Leader" validator node; the other validator nodes may be referred to as "Associate" validator nodes. The Leader node may be changed periodically, on demand, or sporadically by the members of the Committee. When any validator node receives a new transaction request from a non-validator node in the network, the transaction request may be forwarded to all of the validator nodes in the Committee. Further to the disclosed embodiments, the Leader node coordinates with the other Associate validator nodes to reach a consensus of a disposition (e.g., accept or reject) for the received transaction request and broadcasts the consensus to the entire P2P network. If the consensus is to accept or otherwise validate the transaction request, the requested transaction may be added in a new block of a blockchain that is known to at least some of the network nodes in the network.

In accordance with some embodiments, the Leader node may use improved protocols for reaching a consensus with the Associate validator nodes in the Committee when determining the disposition of a received transaction request. For example, in some embodiments, the Leader node may use aggregate signatures to reach a consensus for the transaction request, allowing the consensus to be reached by validating digital signatures from fewer than all of the validator nodes in the Committee. In contrast with prior systems, the Leader node's use of aggregate signatures may permit the Committee to reach a consensus of whether to accept or reject a transaction request faster and/or more efficiently, for example, when one or more of the validator nodes in the Committee did not respond sufficiently quickly or at all.

Advantageously, the disclosed embodiments provide a distributed-system architecture and related protocols that allow a distributed system, such as a blockchain system, to scale up without incurring an unacceptable increase in decision-making complexity while also preserving the benefit of using a decentralized system. The disclosed embodiments reduce the distributed system's reliance on the stability of any particular node(s), as the validator nodes in the Committee may be changed at a sufficient frequency to remove unreliable, unavailable, or otherwise untrusted nodes. Further, the system and method of the disclosed embodiments provides a scheme that helps ensure the Leader node, as well as the other Committee members, functions properly.

It is to be understood that both the foregoing general description and the following detailed description are exemplary and explanatory only and are not restrictive of the disclosed embodiments or the scope of the inventions as claimed. The concepts in this application may be employed in other embodiments without departing from the scope of the inventions.

BRIEF DESCRIPTION OF THE DRAWINGS

The drawings are not necessarily to scale or exhaustive. Instead, emphasis is generally placed upon illustrating the principles of the inventions described herein. The accompanying drawings, which are incorporated in and constitute a part of this specification, illustrate several embodiments consistent with the disclosure and together with the description, serve to explain the principles of the disclosure. In the drawings.

DETAILED DESCRIPTION OF EXEMPLARY EMBODIMENTS

Figure 1:
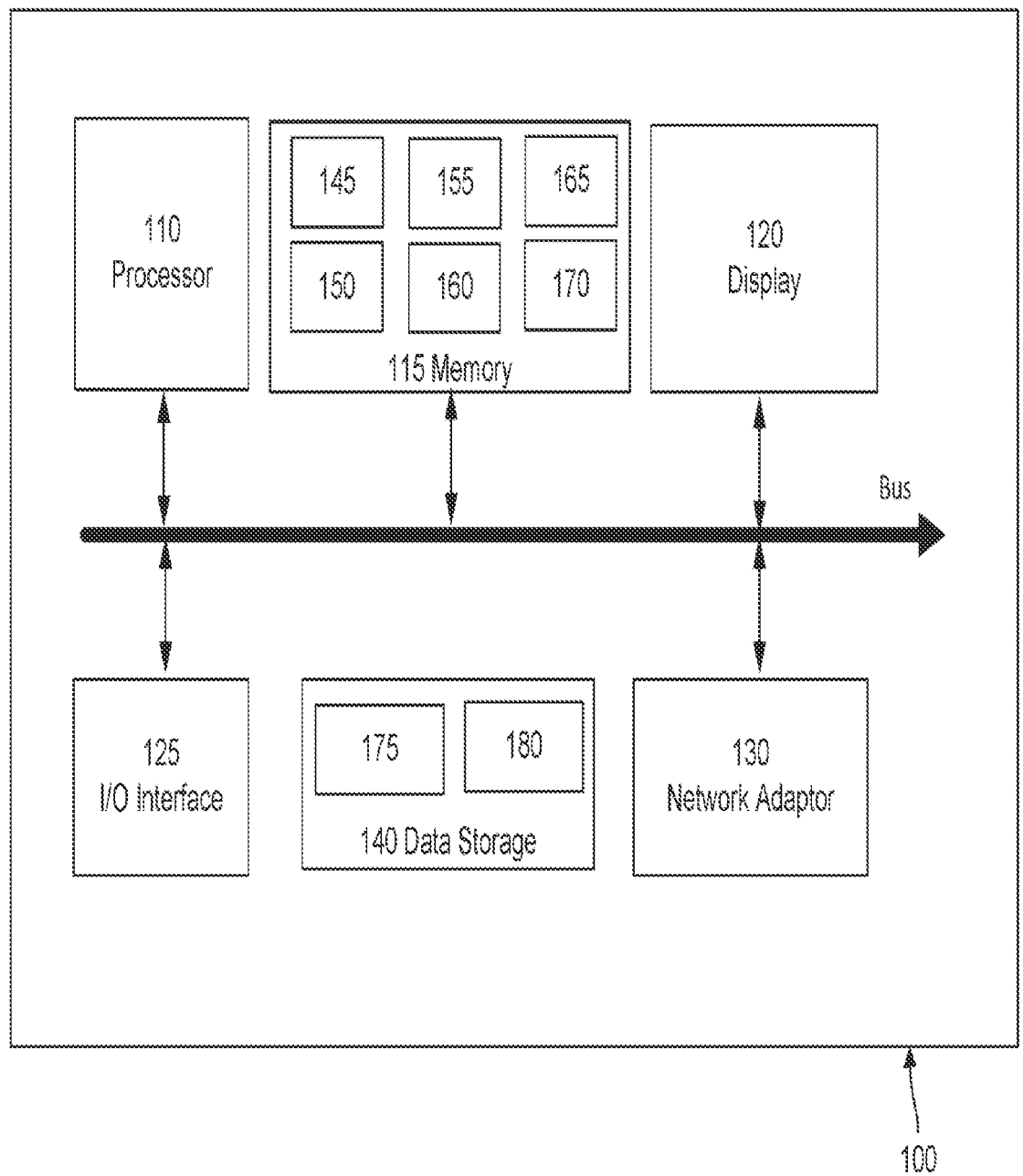
FIG. 1 is a schematic of an exemplary computing system that may be used as a network node in accordance with the systems and methods in the disclosed embodiments.

FIG. 1 is a schematic of an exemplary computing system 105 that may be used as a network node in a network 200 in accordance with the systems and methods of the disclosed embodiments. The computing system may be configured to function, for example, as any of a Client node, Common node, Associate node, or Leader node in the disclosed embodiments. Computing system 105 includes, for example, one or more processors 110, a memory 115, a display 120, I/O interface(s) 125, network interface(s) 130, and data storage 140. These components in the computing system may communicate with each other via a system bus 135, wirelessly, or via one or more wired or wireless communication paths. The components in FIG. 1 may reside in a single device or in multiple devices.

Consistent with the disclosed embodiments, a processor 110 may comprise at least one of a central processing unit (CPU), graphical processing unit (GPU), or similar microprocessor having one or more processing cores. Computing system 100 may include one or more processors 110 and may further operate with one or more other processors that may be located in one or more remote systems. Memory 115 may include non-volatile and/or volatile memory configured to store software instructions for execution on the processor 110, and may include one or more of random access memory (RAM), solid state memory, magnetic memory, register memory, cache memory, or any other type of memory. In some embodiments, memory 115 may comprise one or more removable modules or may at least partially reside in a remote storage device (not shown) outside of system 105. In some embodiments, the memory 115 may be configured to store data and instructions, such as software programs. For example, memory 115 may be configured to store data and instructions. In some embodiments, processor 110 may be configured to execute instructions and/or programs stored in memory 115 to configure computing system 100 to perform operations of the disclosed systems and methods. In various aspects, as would be recognized by one of skill in the art, processor 110 may be configured to execute at least some instructions and/or software programs stored on a remote memory to perform operations of the disclosed systems and methods.

In accordance with certain disclosed embodiments, the memory 115 may include one or more of a campaign engine 145, candidate-selection engine 150, vote-decision engine 155, coordination engine 160, signature engine 165, and view-change engine 170, which may be embodied in one or more software programs, modules, libraries, and/or applications stored in memory 115. The software also may be stored in one or more other data storage devices 140, such as a hard drive or other non-volatile memory for longer term storage.

Campaign engine 145 may generate candidate requests during a first stage of a reconfiguration process, for example, as described in detail with reference to FIG. 7. Candidate-selection engine 150 may verify candidate requests and select the "best" candidate nodes, for example, as described with reference to FIG. 8. Vote-decision engine 155 may verify information transmitted from a Leader node and generate a voting decision based on the verification, for example, as described with reference to FIG. 10. Coordination engine 160 may determine the content of a block of a blockchain and/or generate new blocks for a blockchain. Signature engine 165 may be configured to generate digital signatures using a private key associated with the computing system 105, such as generating partial signatures and aggregated signatures. The signature engine also may be configured to verify received digital signatures using the public keys of other nodes, such as verifying received partial signatures.

View-change engine 170 may detect the need for a view change in a transaction-based system, select a new Leader node, and/or vote for a new Leader node. Depending on the type of a node, certain engines may be loaded and activated, and other engines may be deactivated or deleted from the memory. For example, when a node is configured as a Common node, campaign engine 145 may be loaded and activated and one or more of the other engines 150, 155, 160, 165, and 170 may be deactivated and/or removed from the memory 115. In some embodiments, when a node is configured as an Associate node, it may load and activate the candidate-selection engine 150, vote-decision engine 155, and view-change engine 170. As another example, a Leader node may load and activate the candidate-selection engine 150, coordination engine 160, and signature engine 165. As explained herein, a node may be configured as more than one type of node, in which case the engines corresponding to the configured types may be loaded to the memory 115 and be activated.

Display 120 may be any device adapted to provide a visual output, for example, a computer monitor, an LCD screen, etc. The input/output (I/O) interfaces 125 may include hardware and/or a combination of hardware and software for communicating information between the computing system 105 and a user of the computing system. The I/O interfaces may include, for example, devices such as a keyboard, mouse, trackball, audio input device, touch screen, infrared input interface, or any other input or output device. Display 120 is an optional component. Some nodes may include display 120 while other nodes may omit this device.

Network interface 130 may be a network adapter that includes hardware and/or a combination of hardware and software for enabling the computing system 105 to exchange information with other network nodes in the network 200. For example, the network interface 130 may include a wireless wide area network (WWAN) adapter, a Bluetooth module, a near field communication module, an Ethernet interface, a local area network (LAN) adapter, or any other network interface known in the art for communicating over a network. The network adapter 130 may transmit and receive information from another node in a P2P network.

Data Storage 140 may include one or more data storage devices, such as a computer hard disk, random access memory (RAM), removable storage, or remote computer storage, or an array of such memory devices. In some embodiments, the data storage 140 and memory 115 may share at least one memory device. In other embodiments, the data storage 140 and memory 115 may use separate memory devices. The data storage 140 may include Transaction storage 175, which may be configured to store transactions and/or transaction data, such as a TransactionBlock blockchain in a blockchain implementation. The data storage 140 may also include Key storage 180, which may be configured to store cryptographic key information and/or a KeyBlock blockchain in a blockchain implementation. While Transaction and Key information 175 and 180 are preferably stored in the data storage 150, they also may be stored in the memory 115, for example, as a duplicated copy for the purpose of access or processing efficiency. It should be understood that although the blockchain data structures are explained in the exemplary embodiments, any other data structure alternatively may be adopted, such as doubly-linked lists, heaps, trees, and so forth.

Figure 2:
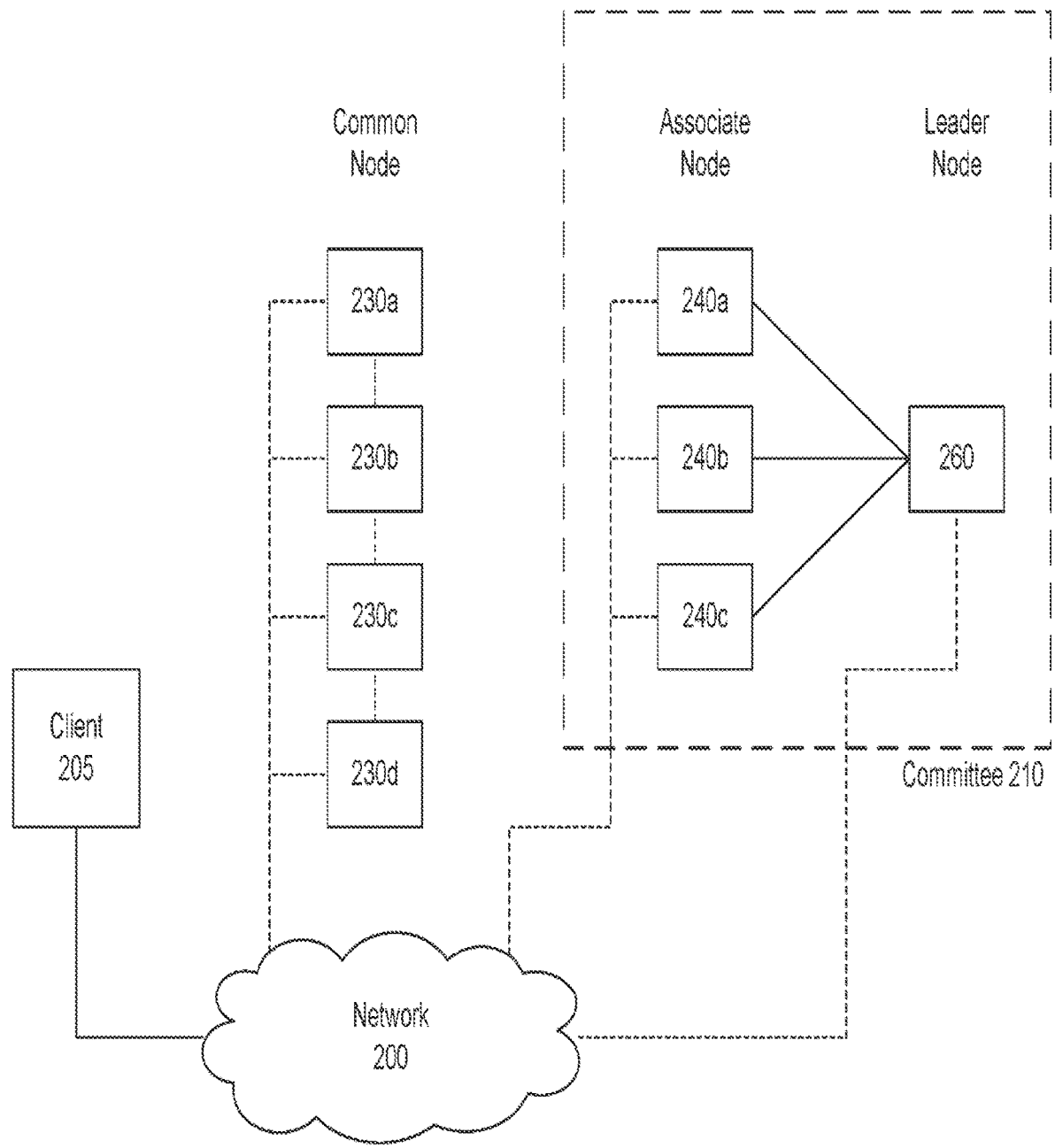
FIG. 2 is a schematic block diagram of an exemplary network architecture that may be used in accordance with the disclosed embodiments of the invention.

FIG. 2 depicts a schematic block diagram of an exemplary network architecture that may be used in accordance with the disclosed embodiments of the invention. In FIG. 2, a network 200 contains a plurality of network nodes, each of which may be directly connected to at least one of the other nodes in the network. Accordingly, at least a portion of the network 200 is configured as a P2P network, and in the disclosed embodiments, the network 200 also may be referred to as the P2P network. The network 200 includes one or more of each of the following types of nodes: Client node 205, Common node 230, Associate node 240, and Leader node 260. Each of the Associate nodes 240 and Leader node 260 are validator nodes that collectively form a Committee 210 of validator nodes. In some cases, the same physical device or devices may be configured to serve as different types of network nodes simultaneously. For example, a computer may be configured to function as a Client node 205 for certain users and also may otherwise function as a Common node in the network 200.

Client node 205 is a network node from which a user may submit a new transaction request. For example, the Client node 205 may provide a transaction request including data for a new transaction block that may be added to a blockchain. In the disclosed embodiments, for example, the user may be any person, software application, or other entity that can generate or otherwise provide a transaction request at the Client node 205.

Each Common node 230 may serve as a bridge, relay, or router configured to forward one or more transaction requests throughout the network 200. FIG. 2 illustrates exemplary Common nodes 230*a-d*, although there may be one or more Common nodes in the network. A Common node 230 may receive a transaction request from the Client node 205 or another Common node 230 in the network 200. In operation, a transaction request may be originated at a Client node 205, routed through the network 200 via one or more Client and/or Common nodes, until it is received by each of the validator nodes in the Committee 210. In accordance with the disclosed embodiments, a Common node 230 may be a candidate to become a new validator node in the Committee 210. Conversely, an Associate or Leader node may be removed from the Committee and, in some cases, may become a Common node.

In the Committee 210, the Leader node 260 coordinates with the other Associate nodes 240 to reach a consensus of a disposition (e.g., accept or reject) for each new received transaction request and, in some disclosed embodiments, broadcasts the consensus decision to one or more network nodes in the network 200. For example, in certain embodiments where each of the Common nodes 230 maintains a copy of a current blockchain, the consensus decision from the Committee whether to add a new transaction block based on a received transaction request may be communicated to at least those Common nodes that store copies of the relevant blockchain. While FIG. 2 illustrates a set of Associate nodes 240*a-c*, those skilled in the art will appreciate there may be one or more Associate nodes in the Committee; there is preferably a single Leader node 260, although it is also contemplated that other embodiments (not shown) could employ more than one Leader node. In some embodiments, each Associate node 240 is configured to communicate directly with the Leader node 260. Further, as part of certain network events or procedures, an Associate node also may communicate directly with one or more other Associate nodes, such as in response to a "View Change" event where the validator-node membership of the Committee is modified to select a new Leader node 260.

Further to the disclosed embodiments, the term of validator nodes in the Committee 210 may be limited. For example, in some embodiments, the Committee may have a predetermined term limit. e.g., measured in time or transactions, after which the specific validator nodes constituting the Committee may be updated or adjusted. One or more members 240 and 260 in the Committee 210 may be replaced at the end of each Committee term. In the disclosed embodiments, the term length for an Associate or Leader node may be defined as a fixed time interval, a predetermined number of transactions or events, or may be in response to one or more predetermined triggering events. In some cases, an Associate or Leader validator node may be removed from the Committee before the end of its term as a result of a discovered malfunction, period of non-responsiveness, malicious behavior, or other event or action deemed unacceptable for participation in the Committee.

Preferably, each Associate and Leader node stores information about each of other validator nodes in the Committee 210. For example, each of the Associate and Leader validator nodes may store the IP address of each of other validator nodes in the Committee. Each Associate and Leader node also may store public keys corresponding to each of the other validator nodes in the Committee. In some embodiments, the validator nodes may maintain "live" or "active" communications connections or sessions with each other and transmit signals from time to time to keep those connections or sessions active. Alternatively, the Associate and Leader validator nodes may not communicate with each other until one or more events trigger a need for such communications, such as in response to a view-change event or any other procedure to select a new Leader node in the Committee.

Figure 3A:
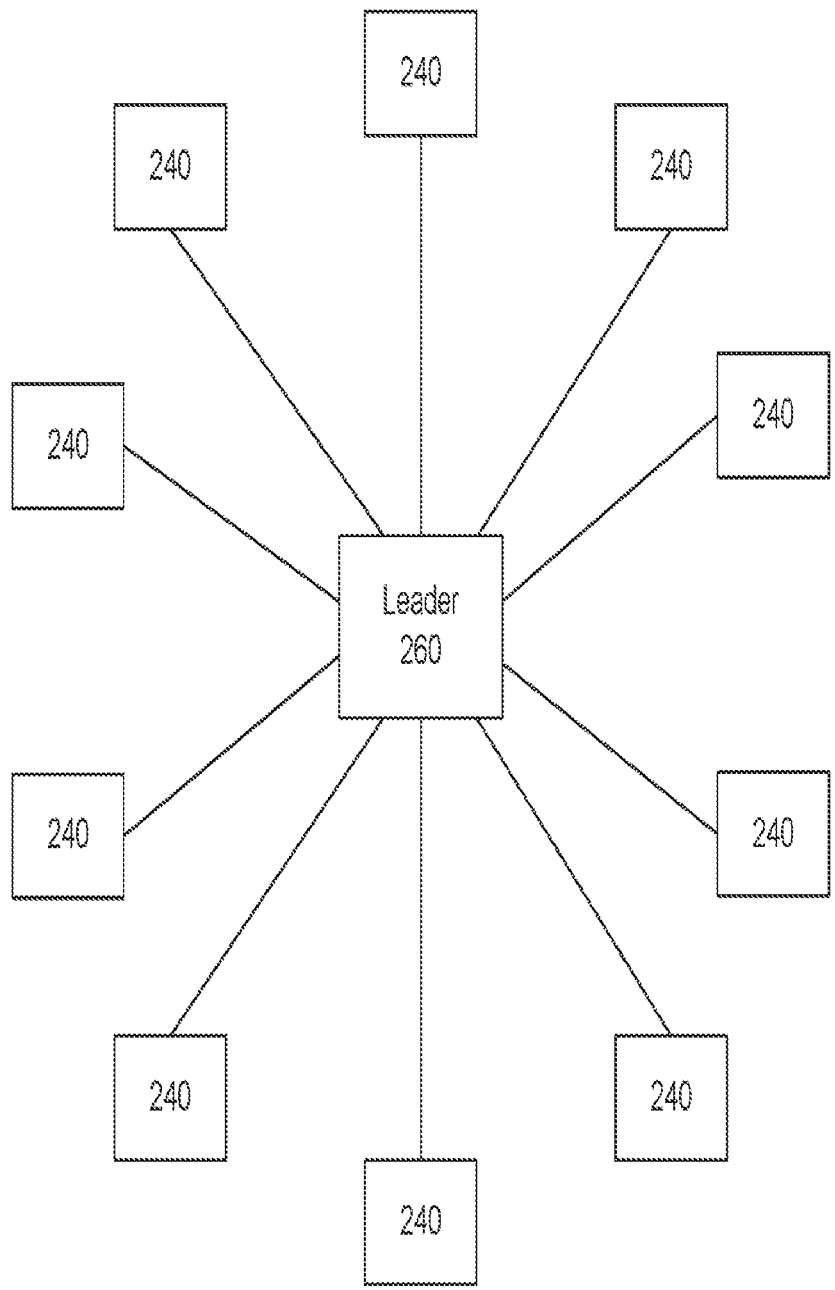
FIGS. 3A and 3B each depict a schematic block diagram of an exemplary network architecture of Committee that may be used in accordance with the disclosed embodiments of the invention.
Figure 3B:
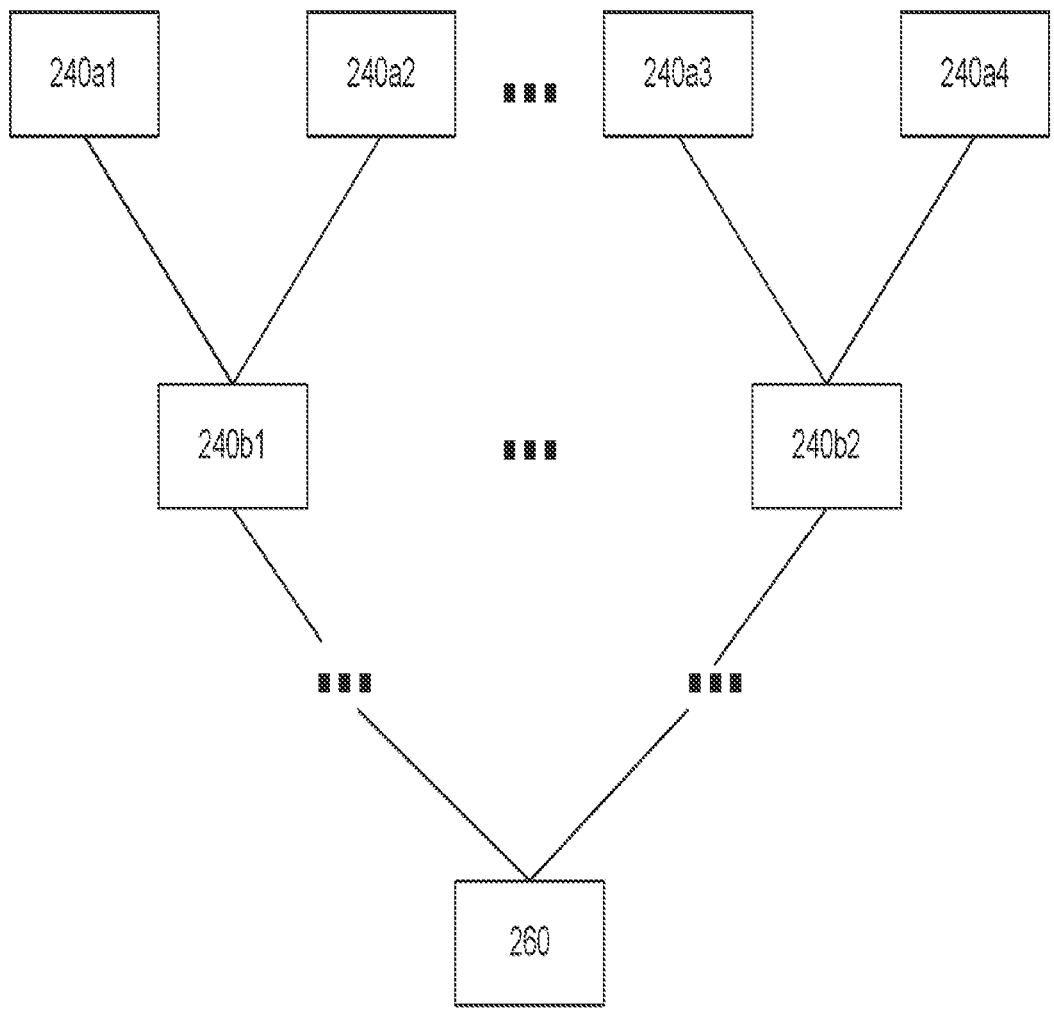

FIGS. 3A and 3B each depict a schematic block diagram of an exemplary network architecture of Committee 210 that may be used in accordance with the disclosed embodiments of the invention. In FIG. 3A, the Committee 210 includes a Leader node 260 and a plurality of Associate nodes 240, each of which may be directly connected to the Leader node 260. In the exemplary embodiment of FIG. 3A, the Associate nodes may be configured to communicate directly with the Leader node 260 until a certain event, such as a view-change event or procedure for changing the Leader node in the Committee, in which case each Associate node in the Committee may communicate with other Associate nodes in the Committee.

In the exemplary embodiment of FIG. 3B, the Committee 210 contains the Leader node 260, the plurality of Associate nodes 240a1, 240a2, 240a3, 240a4, 240b1, 240b2, and one or more other Associate nodes arranged in a tree structure. Each Associate node may be logically connected in the tree structure with at least one parent and/or child Associate nodes. For example, in FIG. 3B. Associate nodes 240a1 and 240a2 are connected with their parent Associate node 240b1, and Associate nodes 240a3 and 240a4 are connected with their parent Associate node 240b2. Associate nodes 240h1 and 240b2 are further connected with one or more additional levels of parent nodes, which eventually are connected to the Leader node 260.

In some embodiments, each parent node in the exemplary tree structure of FIG. 3B is connected with same number of child nodes, and each Associate node other than the root (i.e., the Leader node 260) may have same number of sibling nodes; in other embodiments, the number of child nodes of each parent node may vary. The number of levels in the tree structure and the number(s) of nodes at each level also may vary depending on the implementation of the Committee. Further, the arrangement of the validator nodes in the tree structure may be ordered, for example, where each node in the tree is assigned with a sequence number. Using an ordered data structure, such as an ordered tree in FIG. 3B, for the validator nodes may form a first-in, first-out queue that can serve various purposes described further in the disclosed embodiments.

In some embodiments, the Associate and Leader nodes may each store information about each of all other validator nodes in the Committee 210. In other embodiments, each validator node may store information about only some of the other validator nodes in the Committee 210. For example, an Associate or Leader validator node may be configured to only store information about its parent node, child nodes, sibling nodes, or combinations of such nodes, as defined by the logical arrangement of nodes in the exemplary tree structure shown in FIG. 3B. The stored information may include one or more of the IP address of another validator node, the public key corresponding to that other validator node, and/or other information that may help identify that other validator node. In some embodiments, a validator node may maintain live connections with its parent and child nodes and transmit pulse signals or other messages from time to time, for example, to keep those connections active. Alternatively, a validator node may not communicate with any of the other validator nodes until a certain event, such as a view-change event or procedure for changing the Leader node in the Committee.

Figure 4:
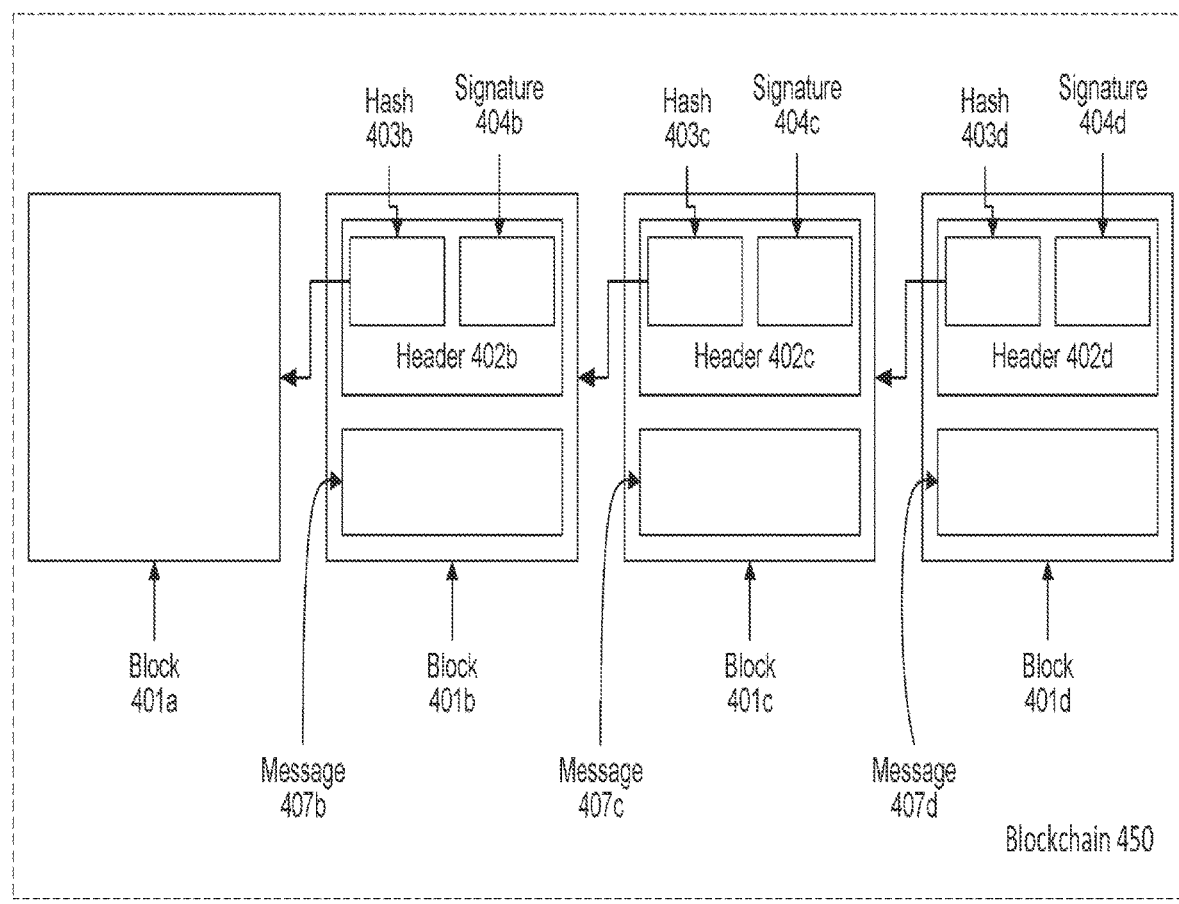
FIG. 4 is a schematic block diagram of an exemplary blockchain that may be used in accordance with the disclosed embodiments.

FIG. 4 illustrates a schematic block diagram of an exemplary blockchain 450 that may be used in accordance with the disclosed embodiments. Copies of the blockchain 450 may be maintained by many different nodes (e.g., Common nodes 230, Associate nodes 240, or Leader node 260 in the network 200. The exemplary blockchain 450 comprises one or more blocks, such as blocks 401a-401d. A block 401 may include at least one message, such as message 407b or message 407d. In this context, the message contains any type of data, such as transaction data that may have been generated by one or more Client nodes in the network.

A block also may include a header, such as the header 402b in block 401b. The header may include, for example, at least one of: a hash value 403b of a previous block in the blockchain 450, a digital signature 404b, a hash value (not shown) based on at least one message 407b, and a timestamp (not shown), which may indicate a date and/or time when the block was added to the blockchain. In some embodiments, the header may be digitally signed with a cryptographic key of an authorized system, and the digital signature may be included in the header. Preferably, this digital signature may be verified using a public key of the authorized system, which may be a node in the network or any other trusted authority.

In accordance with some of the disclosed embodiments, there may be at least two types of blockchains 450: a KeyBlock blockchain and a TransactionBlock blockchain. Although the two blockchains are described separately below, alternatively they could be merged into one blockchain including multiple types of blocks: KeyBlock blocks and TransactionBlock blocks.

Figure 5A:
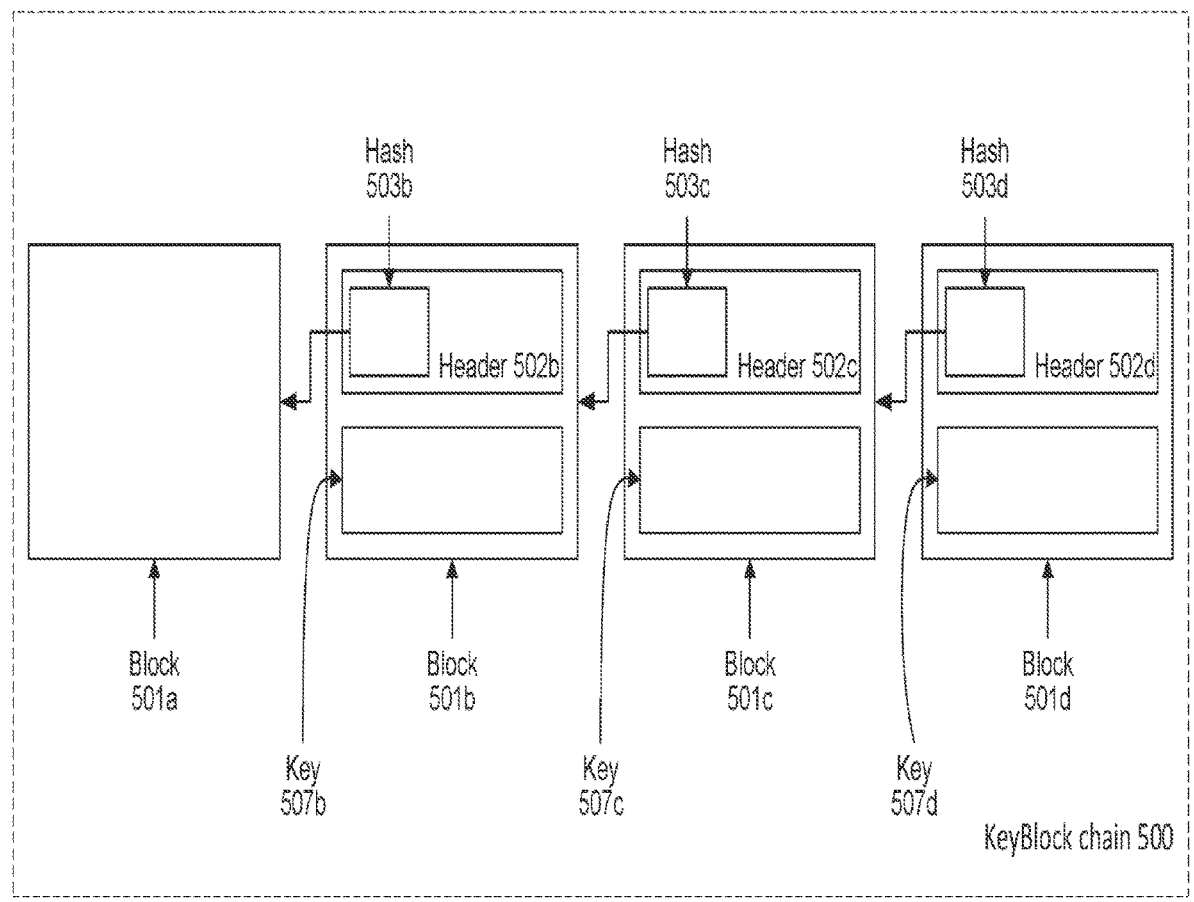
FIG. 5A depicts an exemplary KeyBlock blockchain that may be used in accordance with certain disclosed embodiments

FIG. 5A depicts an exemplary KeyBlock blockchain 500 that may be used in accordance with certain disclosed embodiments. In some embodiments, the KeyBlock blockchain is formed using individual blocks, such as the exemplary Keyblock blocks 501a, 501b, and 501c, which store one or more cryptographic public keys that can be used by at least some of the network nodes in network 200. In an exemplary embodiment, each block 501 in the KeyBlock chain may correspond to a different term of the Committee 210. The message data stored in each block 501 may store one or more public keys for the validator nodes in the Committee 210. When a new Committee 210 is formed, or the validator nodes in the Committee are changed or reassigned, a new block 501 is added to the KeyBlock chain corresponding to the new composition of the Committee. Particularly, a KeyBlock block 501 preferably stores a public "epoch" key, which is a cryptographic key that is used by the validator nodes during the term of the corresponding Committee 210. In some embodiments, each block 501 in the KeyBlock chain also may store the public keys of the individual validator nodes in the block's corresponding Committee 210.

Figure 5B:
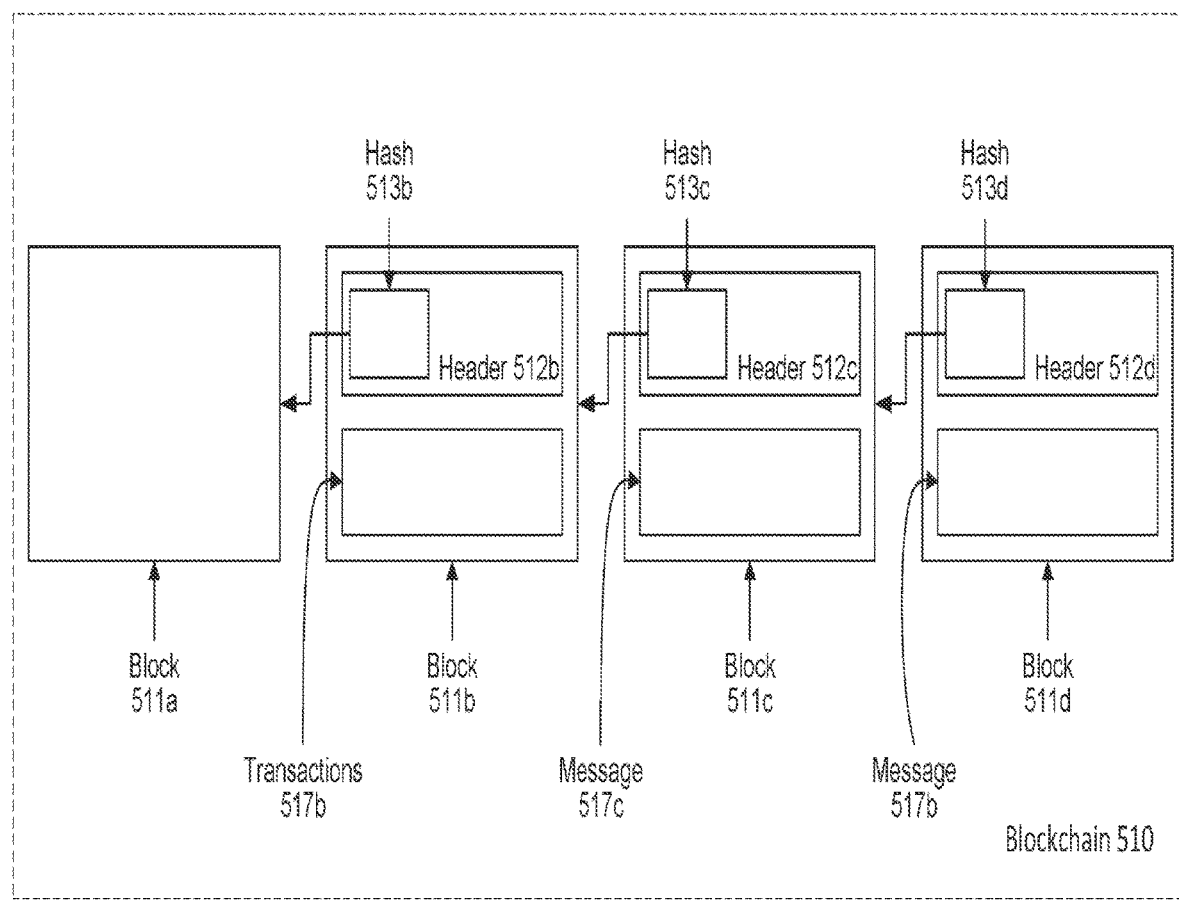
FIG. 5B depicts an exemplary TransactionBlock chain that may be used in accordance with the disclosed embodiments of the invention.

FIG. 5B depicts an exemplary TransactionBlock chain 510 that may be used in accordance with the disclosed embodiments of the invention. A TransactionBlock chain is a blockchain in which individual blocks, such as exemplary TransactionBlock blocks 511a. 511b, and 511c, store messages containing any type of transaction data that may be processed by the system. A TransactionBlock block may contain a message, for example Transactions 517b or 517c, corresponding to one or more transactions in the network. In this context, the transaction data is any data that may be stored in the blockchain 510, and is not limited to any particular type of transaction data. In accordance with the disclosed embodiments, each block 511 in the TransactionBlock blockchain 510 stores information about one or more transactions processed by the Committee. For example, a transaction may correspond to currency or electronic funds transferring, where the information may include payer account information, payee account information, amount to be transferred, and/or the type of currency. By way of another example, a transaction may be a patent assignment agreement, where the information may include the patent number, the assignor and the assignee of the patent. It may also include any witness that has witnessed the transaction or may include the entire contract assigning the patent. The transaction data in the TransactionBlock blocks (TB) 511 generally may correspond to data for one or more financial, legal, commercial, collaborative, or any other types of transactions.

Further to the disclosed embodiments, the TBs are generated by the Committee 210. The Committee 210 may generate a TB in certain time intervals. For example, the Committee 210 may generate a TB every ten minutes or other predetermined time interval, and in this example, the TB may store data for all transactions that the Committee has processed during that time interval. In some embodiments, the Committee 210 may generate a new TB when it has received a certain amount of transaction requests or has processed a certain number of transactions. In some embodiments, the Committee may generate a new TB when a certain amount of transactions are processed or when a certain period of time has lapsed. In yet other exemplary embodiments, a new TB is generated when the size of the transaction data to be included in a TB reaches a threshold sire. For example, a TB may be generated as a result of the Committee having received a predetermined number, such as 1024, currency transactions, whereas another exemplary implementation may generate a new TB when the Committee has received a different number, such as 10, patent transactions to include in a patent assignment, since the data for each patent assignment transaction may be larger than the data required for a currency transaction. Preferably, the TransactionBlock blockchain may be modified in the same manner that the KeyBlock blockchain is modified in the steps described with reference with FIGS. 9-11.

Figure 6:
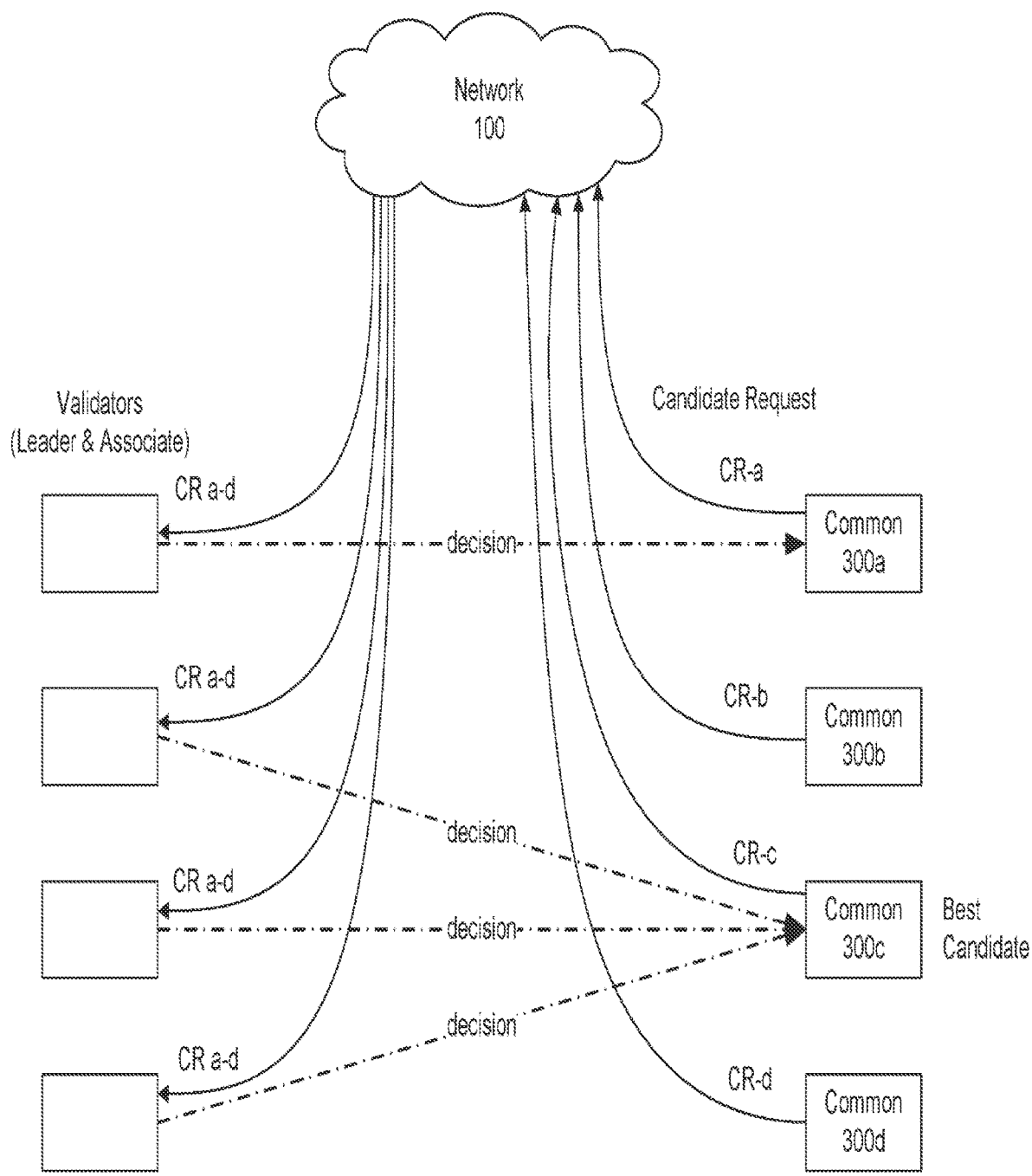
FIG. 6 depicts exemplary communications that may be exchanged among network nodes in network 200 in an exemplary process for reconfiguring the Committee in accordance with the disclosed embodiments.

FIG. 6 depicts exemplary communications that may be exchanged among network nodes in network 200 in an exemplary process for reconfiguring the Committee 210 in accordance with the disclosed embodiments. The first stage of reconfiguring membership of the Committee 210 may be referred to as a "campaign." where Common nodes 230 may compete or otherwise request to become a new validator node in the Committee 210. After a new campaign has started, a Common node 230 may submit a request ("candidate request") to become a new validator node to at least some of the other nodes in the P2P network 200, and the request is received by at least one of the Associate nodes 240 and Leader node 260 in the Committee 210. Multiple candidate Common nodes 230, for example nodes 300*a*, 300*b*, 300*c*, and 300*k* in FIG. 6, may send their respective candidate requests CR-a, CR-b, CR-c, and CR-d, to the validator nodes in the Committee after the campaign is started. In some embodiments, the campaign to select a new validator node may end based on the expiration of a certain time period, triggering event, or reception of a message indicating an end of the campaign in the P2P network 200. In the disclosed embodiments, however, a campaign may be ongoing without a predetermined termination.

In some disclosed embodiments, a candidate Common node 230 may encrypt its candidate request using an epoch public key and transmit the encrypted candidate request through the P2P network. In such embodiments, because the corresponding epoch private key is known only to the validator nodes, only the Associate and Leader nodes may successfully decrypt the received candidate request. Each Associate and Leader node 240 and 260 in the Committee 210 selects what it considers is its preferred candidate to join the Committee as a new validator node based on the candidate requests it has received during the campaign.

A candidate request may include a proof of work (POW), proof of authority (POA), a proof of stake (POS), or any combination of the these. Based on the POW, POA, or POS data in the received candidate requests, each Associate and Leader validator node determines a "best" (preferred or optimal) candidate Common node to join the Committee. After a validator node selects its best candidate, it transmits a "decision," including information necessary to form a request for reconfiguration, to that candidate Common node. When a candidate Common node receives a sufficient number of decisions. e.g., above a threshold number, from the validator nodes, it generates a request for reconfiguration, triggering the second stage of the reconfiguration process.

In the example of FIG. 6, the candidate Common node 230*c* may receive a sufficient number of decisions from the validator nodes. e.g., above a threshold number, in response to its candidate request, and would thereafter prepare a request for reconfiguration. In contrast, the other candidate Common nodes 230*a*, 300*b*, and 300*d*, may not have received enough decisions to initiate the second stage of the reconfiguration process.

Figure 7:
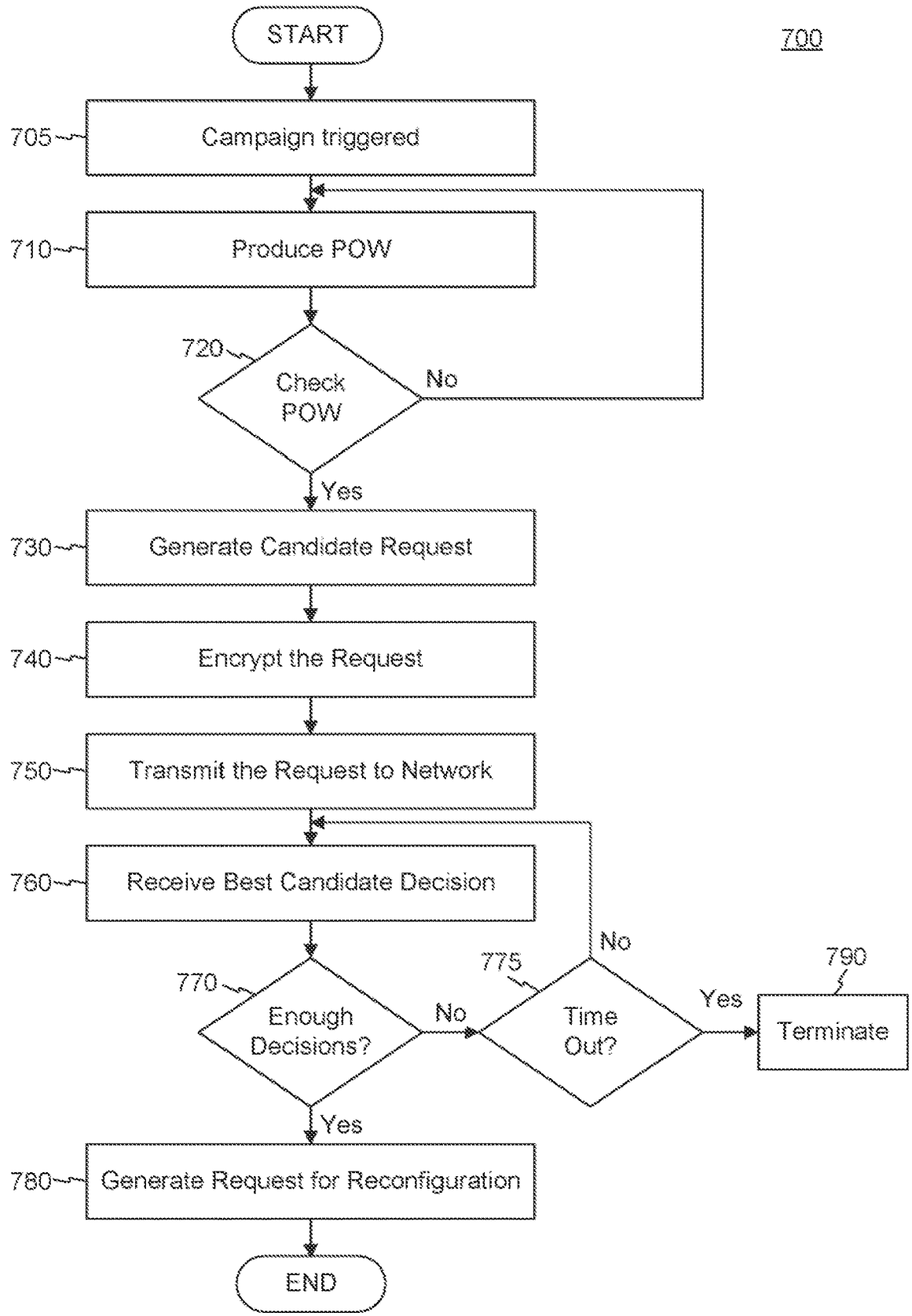
FIG. 7 depicts a flowchart showing a sequence of steps that may be performed by a Common node according to a first stage of the exemplary reconfiguration process in accordance with the disclosed embodiments.

FIG. 7 depicts a flowchart showing a sequence of steps that may be performed by a Common node 230 according to a first stage of the exemplary reconfiguration process in accordance with the disclosed embodiments. In this context, the Common node is a candidate to become a new Associate validator node in the Committee 210. The sequence starts at step 700 and proceeds to step 710, where a campaign is triggered. There are several ways that a campaign may be triggered in the network 200. In some embodiments, a campaign is always triggered, in which case Common nodes may send candidate requests at any time. For example, in such embodiments, a Common node may create a new candidate request whenever it has completed one or more POW challenges. In some embodiments, a campaign may be triggered by certain events, such as a failure of a validator node, an update of a network protocol, or any other predefined event(s). In some embodiments, a campaign may be triggered by a certain time interval. In some embodiments, at least one of the validator nodes in the Committee may communicate the start of a new campaign to the Common nodes in the network.

In some disclosed embodiments, a Common node 230 operates in the campaign by producing at least one proof of work, which is a piece of data that is difficult to produce but easy for others to verify. For example, a POW on message m in may include a hash value of the combination of message m plus a nonce value, where the resulting hash value may have to meet certain conditions, for example, being smaller than a threshold value.

In one illustrative example, a candidate Common node 230 may repeatedly generate a hash value by varying a nonce value (step 710) and checking whether a generated hash value based on the nonce value and/or a message m satisfies a predetermined condition (step 720). If the condition is satisfied, and thus a valid POW is produced, the candidate Common node proceeds to the next step 730. In this example, many algorithms may be used to generate the hash value. For example, in the campaign, the validator nodes may require the hash value to be produced using a SHA-256 algorithm applied to a message n and a nonce value, where the hash value must be smaller than a threshold, such as less than $2^{240}$. Other algorithms could also be used for producing the POW, such as but not limited to Scrypt, Blake-256, CryptoNight, HEFTY1, Quark, SHA-3, scrypt-jane, scrypt-n, and combinations thereof. More generally, the validator nodes in the Committee may require a POW based on any arbitrary selected piece of verifiable information. For example, the network may be configured to require candidate Common nodes 230 to provide a POW based on the first 80 bytes of a current transaction block or on a hash value of the previous block. In another exemplary embodiment, the network may be configured to require candidate Common nodes 230 to provide a POW based on a snapshot of the current system state. In yet other exemplary embodiments, the candidate Common nodes 230 may run the campaign by producing a proof of stake, for example, based on their age, value, or other weighting algorithm(s). In some other embodiments, the candidate Common nodes 230 may run the campaign by producing POA, POS and/or POW data that are included in their candidate requests.

In step 730, the candidate Common node 230 generates a candidate request. As noted, the candidate request may include a POW, POA, or POS or a combination thereof, and it preferably also includes information about the Common node 230 itself, such as one or more of its Internet Protocol (IP) address or other network address, a network or user identifier, a network or user account number, a public key for the candidate Common node, and/or any other relevant information that may be used for identifying the node. The Common node also may digitally sign at least some of the information in its candidate request using its private key.

In step 740, the candidate Common node 230 preferably encrypts the generated candidate request with an epoch public key that is known to all of the validator nodes. In some embodiments, the epoch public key is stored in a current Keyblock block of a Keyblock blockchain, which the Common node has previously accessed to obtain the epoch public key. The encryption may utilize any appropriate encryption algorithm, such as but not limited to SHA3, ECC25519, ED25519, etc. An encryption algorithm is preferably selected so the candidate Common node may encrypt information using the public epoch key, but each of other network nodes in the P2P network 200 cannot decrypt the information unless it knows the epoch private key.

In step 750, the candidate Common node 230 transmits its encrypted candidate request to at least one adjacent ("peer") node in the P2P network 200, wherein the other nodes in the network 200 relay the candidate request to distribute it throughout the network. The candidate request may reach at least one validator node, which in turn makes a decision based on the candidate requests it has received to select a "best" candidate to become a new validator node. In some embodiments, the best candidate decision may be based on the first Common node to send a valid POW, POA, and/or POS in its candidate request. The validator node sends its decision to the selected candidate (e.g., as explained with reference to FIG. 8).

In step 760, the candidate Common node 230 may receive a best-candidate decision from an Associate or Leader validator node if that Common node was selected by the validator node. The Common node 230 then verifies the content of the decision. The Common node 230 may verify, for example, whether a snapshot of system-status information included in the decision matches the system-status information that it has stored locally (or can otherwise access). The Common node 230 may also similarly verify other best candidate decisions that it receives from other validator nodes in the Committee. In some embodiments, the Common node 230 also may verify a digital signature of the decision using a public key of the sending validator node.

In step 770, the candidate Common node 230 determines whether it has received a sufficient number of decisions from validator nodes in the Committee. In some embodiments, for example, the threshold number of validator nodes may be predefined when the system is set up in the P2P network. The threshold number may also be determined or updated each time a new Committee is formed, for example, by adding and/or removing Associate or Leader validator nodes. Preferably, the threshold number is determined based on the fault tolerance of the system. For a tolerance of f, a threshold value of $2f+1$ may be required. If the Common node 230 has not received enough decisions to meet or exceed the threshold, or if it has not received any decision, it continues waiting for validator-node decisions in response to its candidate request. The Common node may wait, for example, until expiration of a time-out period that terminates the process (step 790) or until it has received enough decisions to meet or exceed the threshold (step 770). In some embodiments, the Common node may terminate the process when it receives a new signed KeyBlock block (not shown). In some embodiments, if the Common node 230 receives $2f+1$ decisions, it proceeds to step 780.

In step 780, the candidate Common node 230 generates a request for reconfiguration and transmits the request to each of the validator nodes 240 and 260 in the Committee 210. The request for reconfiguration may include information from the best-candidate decisions it received. It also may include information about the Common node 230, such as a public key it will be using if it is added to the Committee. Because the Committee information is preferably included in each of the best-candidate decisions, the Common node 230 may transmit its request for reconfiguration directly to each of the validator nodes in the Committee.

Figure 8:
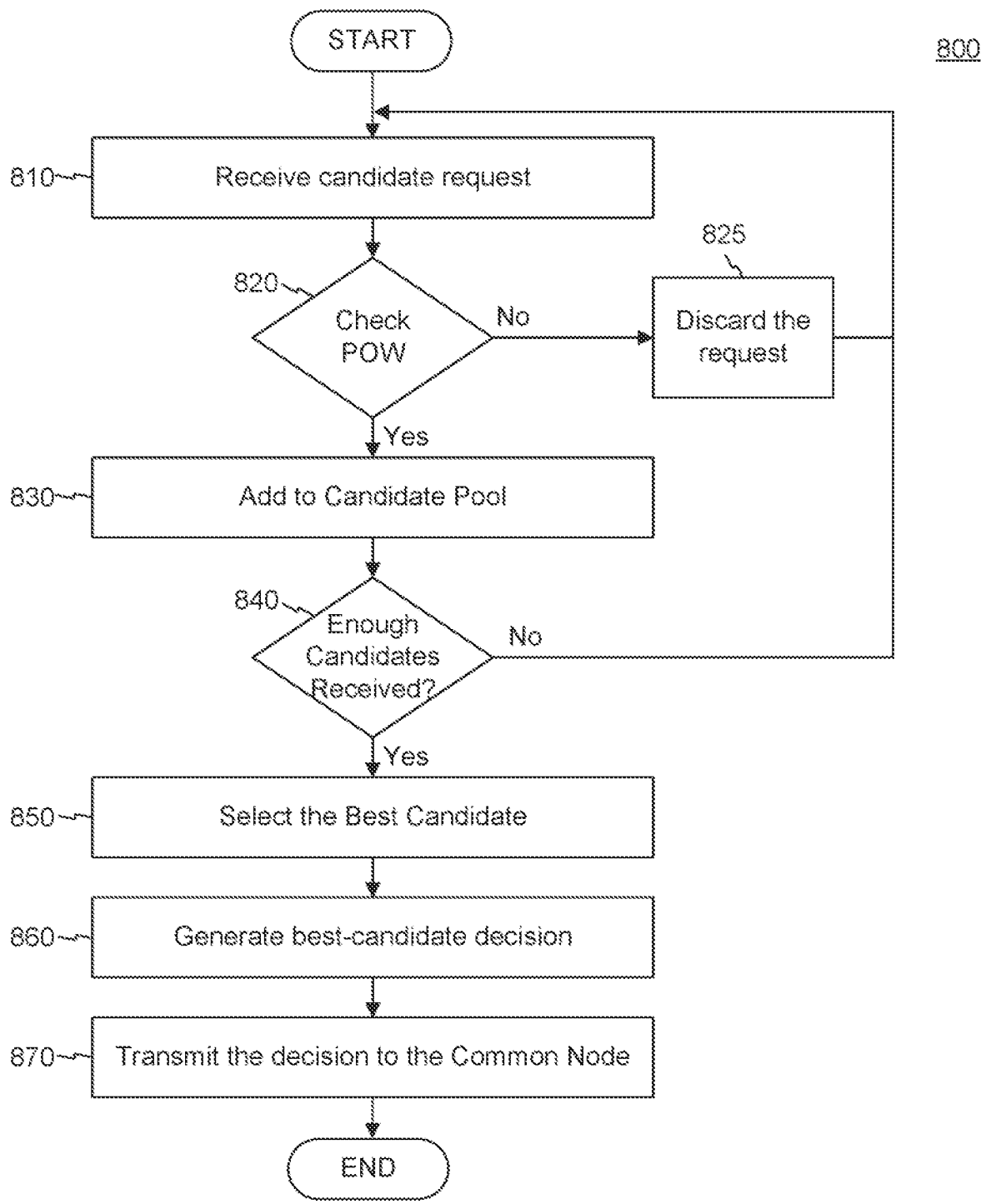
FIG. 8 depicts a flowchart showing an exemplary sequence of steps that a validate node may perform as part of the first stage of the process for reconfiguring the Committee in accordance with the disclosed embodiments.

FIG. 8 depicts a flowchart showing an exemplary sequence of steps that a validate node may perform as part of the first stage of the process for reconfiguring the Committee 210 in accordance with the disclosed embodiments. According to this exemplary embodiment, the Leader node 260 and Associate nodes 240 perform substantially same steps in the first stage of the reconfiguration process. For this reason, the exemplary sequence of steps in FIG. 8 will be generally described below as steps performed by a validator node, without distinguishing steps performed by Associate nodes relative to the Leader node.

In step 810, a validator node receives a candidate request that had been sent from one of the Common nodes 230 in the network 200. In step 820, the validator node verifies the candidate request. In some embodiments, the validator node verifies the candidate request by decrypting it using an epoch private key. e.g., that it previously received from the Leader node 260 or it previously generated if the validator node is the Leader node. If the received candidate request is determined to be valid, the validator nodes adds the candidate Common node corresponding to the candidate request to a candidate pool (step 830). Otherwise, the validator node discards the received candidate request.

In step 840, the validator node may determine whether it has received a sufficient number of candidates, for example, exceeding a threshold number. The size of the candidate pool may vary. In some embodiments, the size of the pool is one, which means each validator node selects the first Common node that has sent a valid candidate request to the validator node. In some embodiments, the size of the candidate pool may be a number selected based on the POW, POA and/or POS being evaluated or otherwise selected based on experience with the particular POW, POA, or POS. In other embodiments, the size of the candidate pool may be indefinite, and in some embodiments, the validator nodes may accept candidate requests for the duration of a predetermined time window. For example, each validator node may accept candidate requests within ten minutes after it receives its first candidate request.

In step 850, the validator node selects its choice of a best candidate from the candidate pool. In one embodiment, such selection may be based on which candidate Common node sent a candidate request including a POW that is closest (or furthest) from a threshold value. For example, if the POW must be smaller than a threshold value as described above, then the validator node may select a Common node as its best candidate based on which Common node sent a POW is closest to the threshold. In other exemplary embodiments, the validator node may select a candidate Common node based on which POW is based on a nonce value that is the smallest, largest, or closest to a predefined number. In some embodiments, the validator node may select the candidate Common node that generates the first valid POW.

Because it may take some time for a candidate request to be transmitted from a candidate Common Node to the validator node through the P2P network, in some embodiments the receiving validator node may wait at least a minimum amount of time before deciding which candidate Common node will be its best candidate, so an earlier-generated but later-received candidate request can be considered, reducing the impact of the P2P network delay to the validator node's decision. In another exemplary embodiment, the validator node's selection may be based on elements other than, or in addition to, POW, such as POS or POA. The validator node may use a weighted equation to determine its selected best candidate.

In step 860, the validator node generates a best-candidate decision, which is a message or other notification that it communicates to the selected candidate Common node, based on the validator node's selection of the best candidate at step 850. The notification may include information about the validator nodes in the current Committee 210, such as but not limited to the IP addresses of each of the validator nodes in the Committee 210. The decision also may include a snapshot of at least some of the current system's state information, including for example the height of one or more blockchains. In some embodiments, the snapshot of the system state may be a hash value of current transaction data.

In step 870, the validator node transmits its candidate-decision notification to the candidate Common node, for example, using the Common node's IP address that was included in the Common node's candidate request. In some embodiments, the transmission of the candidate-decision notification from the validator node to the selected Common node may be further secured using encryption technologies.

Figure 9:
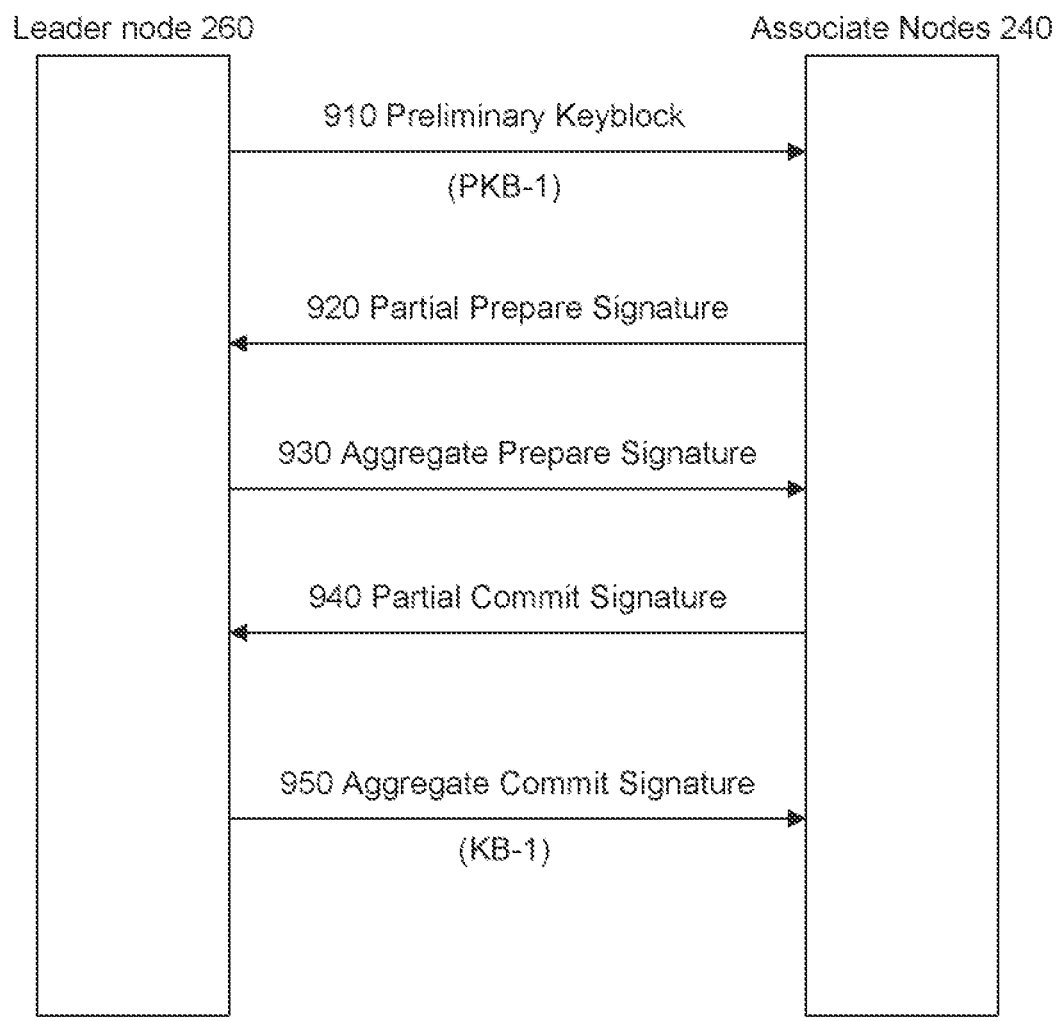
FIG. 9 depicts an exemplary exchange of communications among validator nodes that may be used for reconfiguring the membership of the Committee in accordance with certain disclosed embodiments.

FIG. 9 depicts an exemplary exchange of communications among validator nodes that may be used for reconfiguring the membership of the Committee 210 in accordance with certain disclosed embodiments. As explained with reference to FIG. 7, a candidate Common node 230 may determine that it has been selected to join the Committee when that Common node has received a threshold number of "best" candidate decisions from the validator nodes in the Committee. The selected Common node 230 may generate a request for reconfiguration at step 780 and transmit the request to reconfigure the Committee 210, so as to include the Common node, to each of the validator nodes. In an alternative embodiment, the selected Common node may send the request for reconfiguration to one of the validator nodes in the Committee 210 and that recipient validator node then synchronizes (e.g., forwards) the received request for reconfiguration to the other validator nodes in the Committee 210.

In the second stage of reconfiguring the membership of the Committee 210, the Leader node 260 coordinates with the Associate nodes 240 to reach a consensus over the membership and/or logical configuration of the next Committee 210. It is possible that not all of the validator nodes may have received the selected Common node's request for reconfiguration because of various predictable or unpredictable failures that may have prevented the request from reaching one or more of the validator nodes. It is also possible that some validator nodes may receive incorrect or illegal requests for reconfiguration, for example, from a malicious network node or a malfunctioning node. In either situation, a validator node that fails to receive a proper request for reconfiguration may not function properly in participating in the selection of the membership and/or logical configuration of a new Committee. The disclosed embodiments prevent catastrophic failures in the selection of a new Committee. and allow the validator nodes to reach a consensus about the composition of the new Committee, using a two-round signature protocol that provides fault tolerance even when one or more of the validator nodes has failed or otherwise become compromised. Preferably, to tolerate f failed validator nodes, the Committee must include at least 3f+1 validator nodes.

In step 910, after receiving a request for reconfiguration from a Common node 230, the Leader node 260 verifies the request and creates a Preliminary KeyBlock block (PKB). For the purpose of illustration and discussion in the exemplary embodiment of FIG. 9, the newly created PKB is referred to as the "PKB-1." The Leader node 260 then transmits PKB-1 to each Associate node 240 in the Committee 210. As described above, in some embodiments, the Leader node 260 and Associate nodes 240 may be connected in a star structure, in which case the PKB-1 is transmitted directly from the Leader node to each of the Associate nodes. Alternatively, the Leader node 260 and Associate nodes 240 may be connected hierarchically, such as in a tree structure, in which case the PKB-1 is transmitted from the Leader node at the root of the tree structure and relayed by Associate nodes at the various levels of the hierarchical tree structure, until the PKB-1 has been received by each of the Associate nodes.

In step 920, each Associate node receives and stores the received PKB-1 in its local memory or in any external memory accessible to that node. The Associate node verifies the accuracy of the received PKB-1 by comparing the data in the PKB-1 block with data in the previously-received request for reconfiguration from the selected Common node. The data may represent, for example, the IP address, public key, or other identifying information relating to the selected Common node. Based on the verification performed by each Associate node, each Associate node may independently generate a Partial Prepare Signature (PPS) and transmit the generated PPS to the Leader node 260, either directly or indirectly depending on the logical configuration of the Committee 210. The PPS signature may comprise a digital signature of at least some information stored in the PKB-1 block, and may be generated using the Associated node's private key so the Leader node can subsequently verify the PPS signature using the Associate node's corresponding public key.

In step 930, Leader node 260 collects all of the PPS signatures that it has received from the Associate nodes. When the Leader node has received more than a predefined threshold number of PPS signatures, the Leader node 260 aggregates the partial signatures to create an Aggregate Prepare Signature (APS). The Leader node may transmit the APS signature to the Associate nodes in the same manner that it transmitted the PKB-1.

In step 940, each Associate node 240 verifies the Aggregate Prepare Signature, for example, using the validator node's public key. By verifying the received APS signature, the Associate nodes 240 learn whether a sufficient number of Associate nodes have received the PKB-1. If an Associate node 240 successfully verifies the APS signature, it may generate a Partial Commit Signature (PCS) and transmit the PCS signature to the Leader node 260 in the same manner that it generated and transmitted a PPS signature.

In step 950, the Leader node 260 collects the transmitted PCS signatures. When it receives a threshold number of PCS signatures, the Leader node 260 generates an Aggregate Commit Signature (ACS), indicating that the Leader node has finalized the PKB-1 for addition as a new block to add to the Keyblock blockchain. The Leader node 260 may broadcast the finalized PKB-1, which is referred to as "KB-1" in FIG. 9, to each of the Associate nodes and any Common nodes that store copies of the KeyBlock blockchain in the network 200. After receiving KB-1, each Associate or Common node may verify the authentication of the KB-1 by checking the ACS signature and then, if the block is verified, store the KB-1 in its storage and update its operation in accordance with the information in KB-1. For example, future candidate requests from the Common nodes 230 may be encrypted using a new public epoch key that is included in KB-1.

The new Committee 210 may start operating as soon as the KB-1 is formed and is transmitted to at least one of the Associate or Common nodes. In this example, the new Committee includes the newly-selected Common node, which now becomes an Associate node in the Committee. In forming the new Committee, the Leader node also may have removed a previous Associate node to replace it with the newly-selected Common node, for example, based on the age, priority level, or any other criteria associated with the Associated node being removed from the Committee. The new Committee 210 may, in response to future candidate requests and requests for reconfiguration, generate the next KeyBlock block, for example KB-2, and establish the next Committee using the same procedure discussed above.

Although the exemplary embodiment above is described in the context of a blockchain implementation, persons skilled in the art will understand that other data-management schemes can also benefit from using the two-round signature protocol described above in connection with a Committee having a Leader node and one or more Associate nodes. For example, instead of transmitting the PKB-1 to each Associate node, the Leader node 260 instead may transmit a Structured Query Language (SQL) instruction to the Associate nodes at step 910. In such an alternative embodiment, at step 950 the Leader node may transmit at least one finalized SQL instruction associated with its ACS signature for each Associate and/or Common node that receives the finalized SQL instruction to execute.

Figure 10:
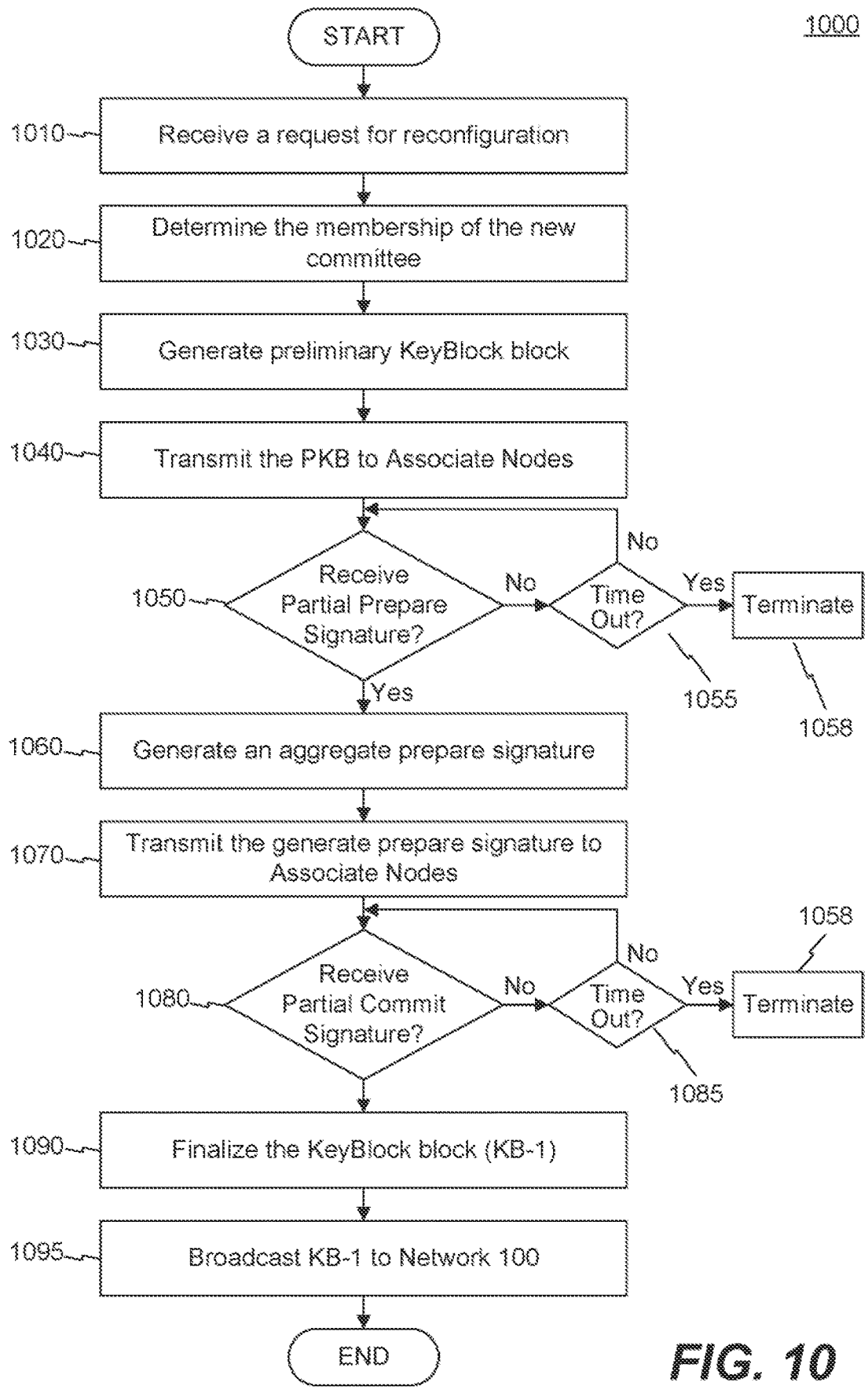
FIG. 10 is a flowchart showing an exemplary sequence of steps that a Leader node may perform as part of a second stage of a process for reconfiguring the Committee in accordance with certain disclosed embodiments.

FIG. 10 is a flowchart showing an exemplary sequence of steps that a Leader node 260 may perform as part of a second stage of a process for reconfiguring the Committee 210 in accordance with certain disclosed embodiments. The sequence starts at step 1000 and proceeds to Step 1010 where the Leader node 260 receives and verifies a request for reconfiguration that it receives either directly from a selected candidate Common node 230 or indirectly via an Associate node 240. The Leader node 260 may or may not have previously transmitted a best-candidate decision to the selected candidate Common node 230 during the first stage of the reconfiguration process. In some embodiments, the Leader node 260 may discard a request for reconfiguration if the request does not correspond to a Common node that the Leader node selected during the first stage of the reconfiguration process. In other embodiments, whether the Leader node has previously selected the Common node does not affect the Leader node's verification of the Common node's request for reconfiguration as long as the request bears sufficient information for verifying whether the candidate Common node has received a sufficient number of "best" candidate decisions from validator nodes in the Committee.

It is possible that the Leader node 260 may receive multiple requests for reconfiguration from candidate Common nodes during the same reconfiguration process. In this case, the Leader node may first select a "best" request for reconfiguration in accordance with certain rules for selecting a "best" candidate. In another embodiment, the Leader node 260 may proceed with multiple requests for reconfiguration. It may verify each request for reconfiguration against information included in one or more previously-received candidate request(s). The Leader node also may verify whether a received request for reconfiguration includes a sufficient number of signatures of validator nodes, for example, above a predetermined threshold number of signatures. The Leader node 260 alternatively, or in addition, may utilize other verification methods to ensure the authentication and accuracy of each request for reconfiguration that it receives for a candidate Common node seeking to join the Committee as a new validator node. Upon the successful verification of the request for reconfiguration, the Leader node 260 proceeds to step 1020.

At step 1020, the Leader node 260 determines the members of the next Committee. Preferably, the next Committee is formed by replacing one or more of the existing the validator nodes in the Committee with candidate node(s) corresponding to the received request(s) for reconfiguration. For example, the Leader node may replace an existing Associate node with the selected candidate Common node that sent the request for reconfiguration, after the Leader node has verified that request at step 1010. In some embodiments, the oldest validator node will be removed from the next Committee and be replaced with the selected candidate Common node. In a blockchain implementation, for example, the validator node that consecutively appears in furthest block may be removed and replaced. In other embodiments, the Leader node 260 may generate a queue of validator nodes according their age or other indication of seniority, for example, where the oldest validator node is at the rear of the queue and the youngest validator node is at the front. The age of the validators may be defined by the length of continuous time that the validator node has served on the Committee. In some embodiments, the Leader node 260 may take other factors, such as POS or past performance or priority levels, into consideration when generating the order of validator nodes in the queue. For example, the Leader node may modify the order of the queue by moving a validator node to the rear of the queue if it has not been working properly. e.g., the validator node has not responded in a previous round of voting, or if the validator node has responded in an incorrect way, or if the validator node has acted suspiciously or maliciously in other ways or has failed to act at all.

In accordance with the exemplary embodiments, the validator node at the rear of the queue would be removed from the next Committee and be replaced with the selected candidate Common node. Those skilled in the art will appreciate that the queue in the exemplary embodiments may be replaced with any other suitable data structure that the Leader node may use to keep track of an order of validator nodes to remove from the Committee, for example, to replace with a selected candidate Common node.

In some embodiments, the Leader node 260 may determine the next Leader node serving the next Committee according to predetermined rules. For example, the Leader node 260 may determine the selected candidate Common node (i.e., the youngest validator node to participate in the next Committee) to be the next Leader. In other embodiments, where a queue of validator nodes has been created, the Leader node 260 may pick a validator node located at a predetermined position in the queue to be the next Leader node. In some embodiments, the Leader node could choose a new Leader node according to a predefine protocol, such as based on a POW challenge among the Associate nodes in the Committee. In yet other embodiments, the Leader node may select a validator node to serve as the next Leader node according to a weighted equation involving POS, POA, age, or other parameters.

In some embodiments, the Leader node 260 may collect the public keys of all the validator nodes of the next Committee after the Leader node has determined which network nodes will be on the next Committee. The public keys may have been previously received and stored in Leader nodes's local memory, or another memory accessible to the Leader node, or the Leader node may request the public keys from each network node that will serve as a validator node on the next Committee. The Leader node may further generate a new pair of epoch public and private keys. The new pair of epoch keys will be used during the term of the next Committee to digitally sign and validate transaction blocks and/or other blockchain blocks. Alternatively, the next Leader node may generate the new pair of epoch public and private keys and transmit, or have transmitted, the new pair of epoch public/private keys to the current Leader node 260. In some embodiments, the new epoch public/private keys are generated by the next Leader node, encrypted using the current epoch public key, and transmitted to the current Leader node, who can validate the encrypted new-epoch keys using the current epoch private key.

In step 1030, the Leader node 260 generates the PKB-1, which is described above with reference to step 910 in FIG. 9, PKB-1, as well as all PKBs, has a structure described with reference FIG. 5A. The PKB-1 may contain the public key of the new epoch key pair. In some embodiments, it also may include public keys of all of the validator nodes of the next Committee. In some embodiments, PKB-1 may contain the height (e.g., length) of a current blockchain and/or other system information or other desired information, PKB-1 may further contain a hash value of the highest (most recent) KeyBlock block in the KeyBlock chain, i.e. the parent KeyBlock block, which may be referred to as KB-0. In this case, the KeyBlock blocks may be linked through their hash values and copies of the KeyBlock blockchain stored and distributed among the validator nodes in the Committee.

After the PKB-1 is generated, the Leader node 260 transmits the PKB-1 to each Associate node in the Committee, either sending it directly or indirectly to the Associate node depending on whether the Leader node has a direct connection to that Associate node (step 1040). In some embodiments, for example, the Leader node 260 may be directly connected to each of the Associate nodes 240, for example, forming a star network. In some embodiments. Associate nodes 240 and the Leader 260 may be connected in a tree structure, in which the Leader node serves as a root node, to which one or more of the Associate nodes are connected. Each Associate node connected to the root then serves as the root node for the next level, to which one or more of the other Associate nodes are connected. In these embodiments, the PKB-1 may be first transmitted to the Associate nodes directly connected to the Leader node 260 and then may be further transmitted by these Associate nodes to other levels of Associate nodes.

In step 1050, the Leader node 260 collects Partial Prepare Signatures from the Associate nodes 240. The PPS signatures may be generated by the Associate nodes using the exemplary process described with reference to FIG. 11. The Associate nodes may transmit their PPS signatures to the Leader node 260 directly or route them to the Leader node via the exemplary tree structure described above with reference to FIG. 3B. To generate an aggregate signature in certain embodiments, the Leader node 260 must receive a threshold number of partial signatures from the Associate nodes. The threshold number of PPS signatures that the Leader node is configured to receive may vary depending on the selection of the multi-signature scheme and/or the fault tolerance of the system. Preferably, the Leader node is configured such that at least 2f+1 signatures are required to create an aggregate signature in a system tolerating f faults. The Leader node 260 may wait, for example, until expiration of a time-out period that terminates the reconfiguration or until it has received the threshold number of PPS signatures, at step 1055. If the time-out period expires, then the process 1000 may terminate at step 1058.

In step 1060, the Leader node 260 generates an aggregate prepare signature using a multi-signature scheme. In the disclosed embodiments, many algorithms may be used to generate the APS signature, such as using Schnorr multi-signatures. The multi-signature scheme may provide that the Leader node waits until it receives a threshold number of signatures from its Associate node co-signers, and when it does, it can generate an APS signature for the entire Committee of validator nodes. In a preferred embodiment, the threshold number is 2f+1 for a system that can tolerate f faulty validator nodes. This threshold may vary depending on the setup of the system. In some embodiments, the aggregate signature generated by the Leader node at step 1060 may be subsequently verified using an epoch public key for the validator-node Committee or by a set of public keys corresponding to individual validator nodes in the Committee.

At step 1070, the Leader node 260 transmits the generated APS signature to the Associate nodes 240 in the same manner as it transmitted the PKB-1 block at step 1040 and, at step 1080, the Leader node collects partial commit signatures from the Associate nodes in the same manner as it collected the PPS signatures in step 1050. The Leader node 260 may wait, for example, until expiration of a time-out period that terminates the reconfiguration or until it has received a threshold number of PCS signatures, at step 1085. If the time-out period expires, then the process 1000 may terminate at step 1058. In some embodiments, the Leader node 260 may transmit a private epoch key to an Associate node in response to receiving a PCS signature from that Associate node. In alternative embodiments, the Leader node 260 may transmit the private epoch key to the Associate nodes at another time in the process 1000.

When it receives at least a predetermined threshold number of PCS signatures from the Associate nodes, at step 1090 the Leader node 260 generates an aggregate commit signature in the same manner as it generated the APS signature in step 1060. The Leader node finalizes the PKB-1 block by incorporating the generated ACS signature into the PKB-1 block, thereby creating a finalized KeyBlock KB-1. At step 1095, the Leader node 260 transmits the KB-1 block to each of the Associate nodes and, optionally, transmits KB-1 to at least one of Common nodes. The Leader node may broadcast the KB-1 block or otherwise transmit it so the new Keyblock KB-1 is received by each of the Associate nodes and any Common node(s) storing a copy of the Keyblock blockchain. After receiving the new KB-1 block, the Associate nodes and Common nodes may further transmit the KB-1 block to other network nodes in the network 200 to ensure it is added to every copy of the Keyblock blockchain.

Figure 11:
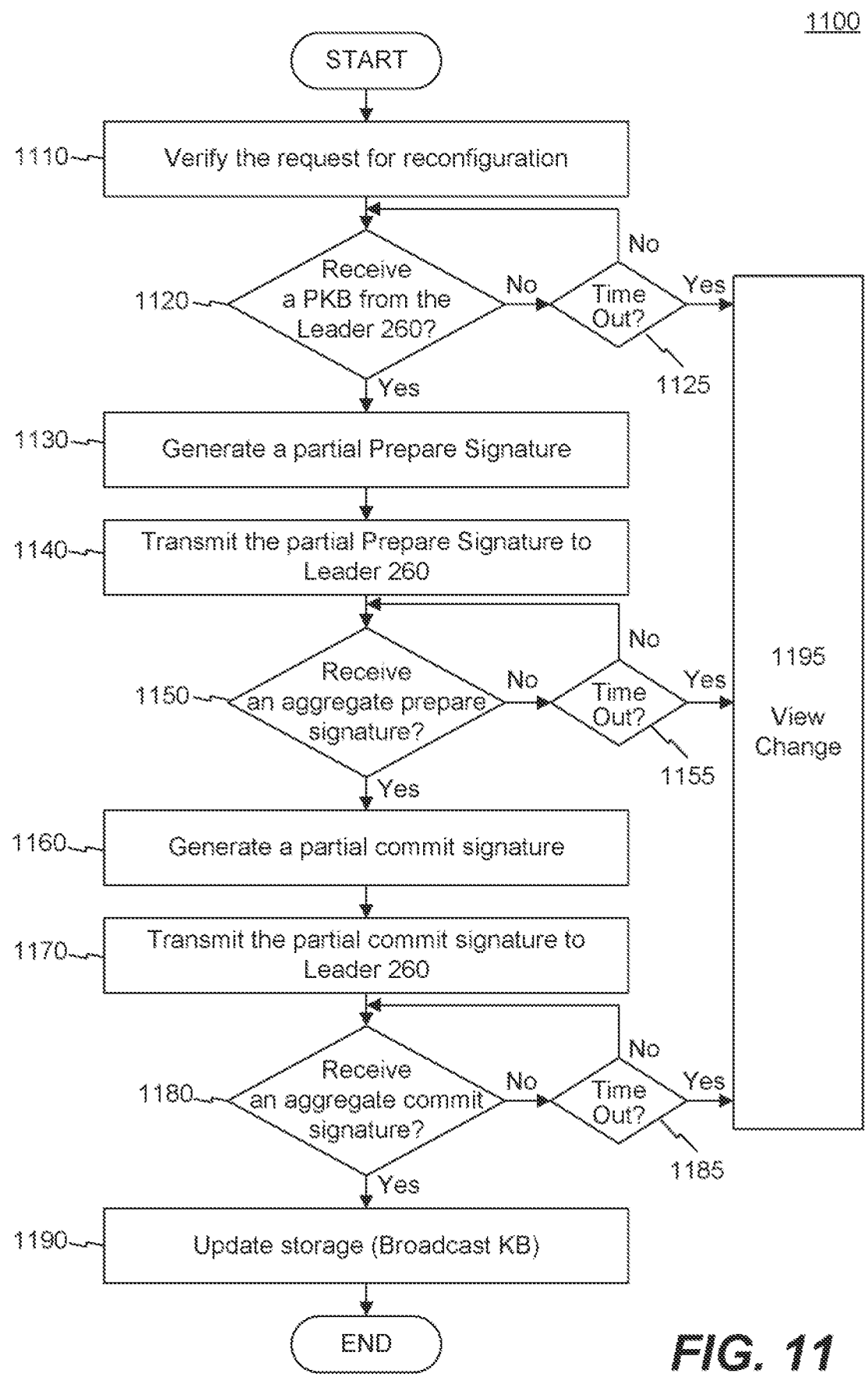
FIG. 11 depicts a flowchart showing a sequence of steps that an Associate node may perform as part of a second stage of the exemplary process for reconfiguring the Committee in accordance with the disclosed embodiments.

FIG. 11 depicts a flowchart showing a sequence of steps that an Associate node 240 may perform as part of a second stage of the exemplary process for reconfiguring the Committee 210 in accordance with the disclosed embodiments. The sequence starts with step 1100, where the Associate node 240 receives a request for reconfiguration from a Common node 230. As explained above, the request for reconfiguration indicates the Common node has received at least a predetermined number of best-candidate decisions from the validator nodes in the Committee, for example, that were returned to the Common node in response to its POW challenge, POA, and/or POS that it provided to the Committee to be selected as a new validator node in the Committee 210. The Associate node may receive the request for reconfiguration directly from the Common node associated with the request. Alternatively, the Associate node may receive the request from another validator node. In some embodiments, the Associate node may decrypt the request using an epoch private key before further accessing and/or processing the contents of the request.

In step 1110, the Associate node verifies the received request for reconfiguration. For example, it may verify whether the request for reconfiguration contains sufficient information, for example at least one valid digital signature, to establish the Common node associated with this request has received at least a predetermined number of best-candidate decisions. In some embodiments, the Associate node may verify whether information in the request matches, or is consistent with, at least some system information that the Associate node stores. The Associate node also may verify whether the received request for reconfiguration contains sufficient information to add the Common node as a validator node in a new Committee 210, for example, based on at least one IP address, public key, etc. in the request for reconfiguration. In some embodiments, it is irrelevant whether the Common node associated with the request is the Common node that the Associate node has selected as its "best" candidate for the new Committee during the first stage of the reconfiguration process. On the other hand, in some alternative embodiments, the request may fail to pass the Associate node's verification if the Common node corresponding to the received request is not the same Common node that the Associate node selected in the first stage of the reconfiguration process.

The Associate node may receive requests for reconfiguration associated with different Common nodes during the same reconfiguration of the Committee 210. In some embodiments, the Associate node 240 may have to determine a "best" request for reconfiguration from among the requests for reconsideration that it received based on one or more rules. e.g., as agreed by the validator nodes or otherwise configured within the system. For example, in some embodiments, when the Associate node receives requests for reconsideration associated with different Common nodes, the Associate node may determine that the request including the earliest timestamp should be processed for the second stage of the reconfiguration process in FIG. 11. In some other embodiments, the Associate node may process all the requests for reconfiguration that it has received during this stage of the reconfiguration process.

In step 1120. Associate node 240 may receive the preliminary KeyBlock PKB-1 from the Leader node 260. Further to the disclosed embodiments, the Associate node may verify whether the received PKB-1 was generated by the Leader node 260 by verifying a digital signature in the PKB-1, for example, using the Leader 260 node's public key. It also may verify whether the PKB-1 was generated in accordance with the request for reconfiguration it received in step 1110. For example, the Associate node may verify the accuracy of members of the proposed new Committee identified in the received PKB-1. In some embodiments. Associate node 240 may determine the members of the new Committee and compare its determined list of members with members identified in the PKB-1. In yet other embodiments, the Associate node 240 may generate its own preliminary KeyBlock block and compare its generated KeyBlock block with the received PKB-1. If the PKB-1 fails to pass the Associate node's verification(s), or the Associate node does not receive any PKB-1 from the Leader node 260 before expiration of a timeout period at step 1125, the Associate node may initiate a view change procedure to select a new Leader node at step 1195. Otherwise, the Associate node 240 proceeds to step 1130.

In step 1130, the Associate node generates a partial prepared signature using its private key that has not been disclosed to other network nodes in the network 200. In some embodiments, the PPS signature may be generated using a multi-signature scheme.

In step 1140, the Associate node 240 transmits the generated PPS signature to the Leader node 260. In some embodiments, the Associate node may transmit the generated PPS signature directly to the Leader node 260 or indirectly to the Leader node, for example, when the validator nodes are organized in a tree structure as illustrated in FIG. 3B. In an exemplary embodiment, the Associate node may first transmit the PPS signature to its parent node, which in turn relays this partial signature to the next level until the signature reaches the Leader node 260. For example, with reference to FIG. 3A, the Associate node 240$a$1 generates a PPS signature and transmits the partial signature to the Associate node 240$b$1. The Associate node 240$b$1 may generate its own PPS signature, which it may transmit separately or together with the PPS signature that it received from Associate node 240$a$1, to the Leader node 260.

In another embodiment, multiple Associate nodes may transmit PPS signatures to the same parent Associate node in the hierarchical arrangement of the Committee's validator nodes. The parent Associate node may generate an aggregated partial signature using the PPS partial signatures that it has received from its child nodes and transmit the aggregated partial signature to its parent Associate node at the next level of the hierarchical arrangement. The aggregated partial signature may be a concatenation of multiple PPS signatures (signed or unsigned) or may be otherwise derived from the multiple PPS partial signatures. For example, the Associate node 240$a$1 may generate a partial signature and transmit the PPS signature to Associate node 240$b$1. Associate node 240$b$1 generates a aggregate partial signature using PPS signatures it has received from Associate nodes 240$a$1 and 240$a$2 and, optionally, a partial signature generated by itself. The Associate node 240$b$1 then transmits the generated aggregated partial signature to the next level, for example the Leader node 260, which further aggregates received PPS partial signatures from the Associate nodes.

In step 1150, the Associate node 240 receives an aggregate prepare signature from the Leader node 260. After the APS signature is received, the Associate node verifies the authentication of this aggregate signature. Depending on the multi-signature scheme used by the validator nodes in the Committee for this stage of the reconfiguration process, the Associate node may verify the signature using one or more public keys it has previously received. If the received APS signature fails the Associate node's verification, or if the Associate node does not receive any APS signature before the expiration of a time-out period at step 1155, the Associate node may initiate a view change process at step 1195.

After the Associate node has verified the Leader node's APS signature at step 1150, the Associate node 240 can be confident that a sufficient number of Associate nodes in the Committee have received and verified the PKB-1 block. Then, at step 1160, the Associate node 240 generates a partial commit signature in the same manner as it generated a partial prepare signature in step 1130, and at step 1170 it transmits the PCS signature in the same manner as it transmitted the PPS signature in step 1140. In some embodiments, the Associate node 240 may generate a PCS signature using a different algorithm than it uses to generate a PPS signature.

In step 1180, the Associate node receives an aggregate commit signature from the Leader node 260. In some embodiments, the Leader node may transmit the finalized the KB-1 with the ACS signature. Further, in some embodiments, the Leader node may only transfer the ACS signature and each Associate node adds the received ACS signature to the PKB-1 block that it previously received at step 1120, thereby creating the same KB-1 block at each of the Associate nodes. The ACS signature may be verified in the same manner as described in step 1150. If the received ACS signature fails the Associate node's verification, or if the Associate node does not receive any aggregate commit signature before the expiration of a time-out period at step 1185, the Associate node may initiate a view change process at step 1195.

After the Associate node has verified the ACS signature, the Associate node may be confident that a sufficient number of Associate nodes have confirmed that they have learned that a sufficient number of Associate nodes received the proper PBK-1 block. At step 1190, the Associate node may add the new Keyblock block KB-1 to its copy of the Keyblock blockchain and also may update its database in accordance with at least some information contained in the received PBK-1. In some embodiments, the Associate node may further transmit the KB-1 to at least one Common node in the network 200. Although the Keyblock data structure described in the context of FIGS. 10 and 11 is in the form of a blockchain, those skilled in the art will understand that the disclosed embodiments may be implemented when adding new information to other types of data structures that could also be benefit from the reconfiguration processes described above.

Figure 12:
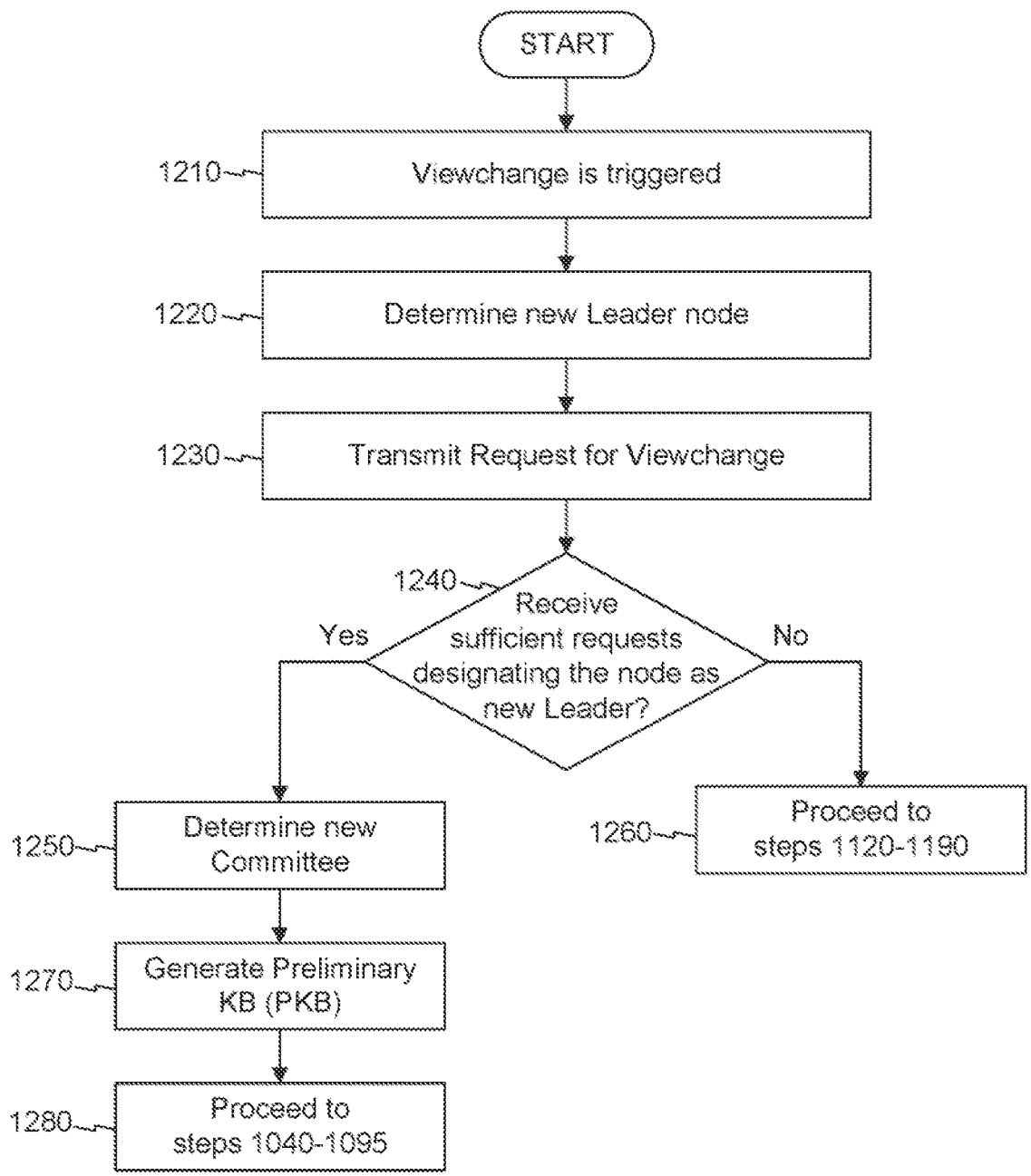
FIG. 12 depicts a flowchart showing a sequence of steps that an Associate node may perform as part of an exemplary view-change process to select a new Leader node in accordance with certain disclosed embodiments.

FIG. 12 depicts a flowchart showing a sequence of steps that an Associate node 240 may perform as part of an exemplary view change process 1195 to select a new Leader node 260 in accordance with certain disclosed embodiments. The view change process may be used to change the Leader node 260 in cases where the Leader node is deemed inappropriate to continue serving as the Leader node. For example, the Leader node may have stopped responding because of a denial of service (DoS) or distributed DoS attack. In other embodiments, one or more of the Associate nodes may detect that the Leader node 260 has been compromised, for example, by software and/or people within or outside of the entity, such as an enterprise or government, that manages the network 200. An Associate node also may determine that the Leader node is malfunctioning in various scenarios, including the scenarios described with reference to FIG. 11. For example, the Associate node may detect that the Leader node has not sent any new KeyBlock and/or TransactionBlock blocks for a predetermined amount of time, which may be a configured time limit set by a system administrator or otherwise agreed upon by the Associate nodes. The Associate node also may detect that the Leader node may have sent out one or more erroneous preliminary blocks, such as blocks including a wrong signature or one or more blocks with incorrect information.

Multiple Associate nodes that detect a malfunctioning of the Leader node 260 may initiate a view change process at or around a same time. In some embodiments, each Associate node 240 may select a new Leader node according to a set of predefined rules. Preferably, a new Leader node is selected based on a consensus by a majority of the Associate nodes. When a consensus is reached to identify the new Leader node, although it has not yet been formally recorded as the Leader node in a new KeyBlock block of the KeyBlock blockchain, the new Leader node may act as a Leader node and generate the new preliminary KeyBlock block PKB-1, which will identify the new Leader node for the next Committee 210. Thereafter, the new Leader node may coordinate with the Associate nodes to reach a consensus decision to finalize and adopt the new KB-1 block recording the composition of the new Committee including the new Leader node.

The sequence starts at step 1200 and proceeds to step 1210, where a view change process is triggered. A view change may be triggered when an Associate node 240 determines the Leader node is malfunctioning, compromised, or otherwise untrusted or unavailable. The view change also may be triggered when the Associate node receives requests for a view change from a threshold number of Associate nodes. In some embodiments, for example, a predetermined threshold number of Associate nodes required to trigger a view change is f+1, for a system having fault tolerance off validator nodes.

In step 1220, an Associate node 240 determines, for example according to one or more rules, or otherwise selects a new Leader node. As described with reference to step 1020 of FIG. 10, there may be various strategies to select a new Leader node. In some embodiments, the Associate node selects a new Leader node using the same strategy that the Leader node 260 selects a new Leader node in step 1020. In some embodiments, the Associate node may select a new Leader node using a different strategy than the Leader node 260 uses. For example, the current Leader node in step 1020 may select the youngest validator node to be the new Leader node while the Associate node in step 1220 may select the oldest validator node to be the new Leader node.

In step 1230, an Associate node 240 transmits a request for view change to the other validator nodes in the Committee. The request for view change may include information about the new Leader node, such as but not limited to its IP address, public key, or other identifying information. The request for view change may be encrypted or signed by the Associate node using a known algorithm, using either its own private key or the Committee's epoch private key. In some embodiments, an Associate node may perform this step before performing step 1220 and, thus, the request for view change may not include information about the new Leader node. If a request for view change is transmitted before the Associate node determines the new Leader node, the Associate node may send an updated request, or any other notice or message indicating the Associate node's selection for a new Leader node, after it has determined the new Leader node. In such embodiments, the Associate node may transmit its updated request for view change (or other notification or message) identifying its selection for a new Leader node to its selected new Leader node and, optionally, also to the other Associate nodes. Even if an Associate node determines that it should be the new Leader node, the Associate node still may transmit the request for view change to the other validator nodes in the Committee.

In some embodiments, an Associate node 240 may transmit the request for view change to the other validator nodes directly, regardless of the network structure of the Committee 210. In some embodiments where a tree structure is adopted, the Associate node may only transmit the request to its child, parent, and/or sibling nodes, if such nodes exist. In these exemplary embodiments, an Associate node receiving such a request for view change may further transmit the request to its own child, parent, and/or sibling nodes to propagate the request throughout the hierarchical tree structure.

In step 1240, the Associate node 240 receives and verifies requests for view change that it receives from the other validator nodes. It examines each received request to determine whether it has been selected as the new Leader node in the request. In some embodiments, if the Associate node determines that it has received a predetermined threshold number of requests for view change that designates itself as the new Leader node, then the Associate node assumes it has become the new Leader node in the Committee. The predetermined threshold number for this determination is preferably greater than or equal to 2f+1 requests identifying the Associate node as the new Leader node, where f is an intended fault tolerance of the system. At step 1260, if the Associate node determines that it has not received the predetermined threshold number of requests and a predefined time-out period is expired, it may continue serve as an Associate node in the Committee or start another round of view-change, choosing a second best leader based on the rules described at step 1220, if it determines a new Leader node has not been properly selected by the network.

In step 1250, the Associate node 240 assumes that it is the new Leader node and determines the validator-node membership of the new Committee 210. In some embodiments, the membership of the Committee does not change except that the Associate node becomes the new Leader node and the existing Leader node becomes an Associate node. In other embodiments, the existing Leader node may be removed from the Committee 210. If the existing Leader node is removed, a new campaign may be triggered to identify a Common node to add to the new Committee. In alternative embodiments, a new campaign is not triggered when a new Leader node is selected and the old Leader node is removed, in which case the new Committee may contain one less validator node. In such alternative embodiments, one less validator node may be removed in the next reconfiguration process.

In step 1270, the assumed new Leader node generates a Preliminary KeyBlock block PKB-1 reflecting the determined membership of the new Committee as described in steps 1020 of FIG. 10. In step 1280, the assumed new Leader node coordinates with the other Associate nodes to perform the process of the second stage of reconfiguration to finalize the new Committee in the same manner as described with reference to FIGS. 9-11.

In step 1250, where the Associate node determines it is not selected as the new Leader node, the Associate node may act as an ordinary Associate node and coordinate with the new Leader node to perform the process of the second stage of reconfiguration to finalize the new Committee in the same manner as described with reference to FIGS. 9-11.

After a new KeyBlock block is signed by the new Committee, including the new Leader node, with an aggregate commit signature, the new KB block is broadcasted or otherwise transmitted to network nodes in the network 200 and the view change process is completed.

Although the steps described with reference to FIG. 12 are sequenced, these steps are not necessarily performed in the order of the exemplary sequence. In some embodiments, for example, some of the Associate nodes in the Committee may perform certain steps in FIG. 12 first while other Associate nodes may perform these steps later.

While illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed routines may be modified in any manner, including by reordering steps and/or inserting or deleting steps.

For example, the methods and systems described herein may be deployed in part or in whole through a machine that executes computer software, program codes, and/or instructions on a processor. The present invention may be implemented as a method on the machine, as a system or apparatus as part of or in relation to the machine, or as a computer program product embodied in a computer readable medium executing on one or more of the machines. In some embodiments, the processor may be part of a server, cloud server, client, network infrastructure, mobile computing platform, stationary computing platform, or other computing platform. The storage medium associated with the processor for storing methods, programs, codes, program instructions or other type of instructions capable of being executed by the computing or processing device may include but may not be limited to one or more of a SSD, optical disk, flash memory, hard disk, RAM, ROM, cache and the like.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. As noted above, it will further be appreciated that one or more of the processes may be realized as a computer executable code capable of being executed on a machine-readable medium.

Accordingly, it is intended that the specification and examples be considered as exemplary only, with a true scope and spirit being indicated by the following claims and their full scope of equivalents.

What is claimed is:

1. A network node in a network comprising a committee of validator nodes and at least one client node, the network node comprising at least one processor and at least one memory containing instructions that, when executed by the processor, configure the network node to perform the following steps of a reconfiguration process for reconfiguring the membership of validator nodes in the committee, the steps comprising:
   in a first stage of the reconfiguration process:
      transmitting to the committee of validator nodes a request to become a new validator node in the committee;
      receiving a response from at least one validator node in the committee confirming that the network node has been selected to become a new validator node in the committee; and
   in a second stage of the reconfiguration process:
      generating a request for data confirming the network node is the new validator node;
      receiving the data, wherein the data indicates that at least a threshold number of validator nodes have confirmed that the network node is selected to be the new validator node; and
   coordinating with the other validator nodes in the committee to process a transaction received from the client node in the network.

2. The network node of claim 1, wherein the transaction received from the client node contains transaction data and the validator nodes in the committee process the transaction data to form a new block to be added to a TransactionBlock blockchain.

3. The network node of claim 1, wherein public key information for at least one of the validator nodes in the committee is stored in a current block of a KeyBlock blockchain.

4. The network node of claim 1, wherein the instructions that, when executed by the processor, further configure the network node to perform: coordinating with the other validator nodes in the committee to add a new block to a KeyBlock blockchain, the new block corresponding to the committee including the network node.

5. The network node of claim 1, wherein the identity of at least one validator node in the committee is unknown to the network node before the network node receives the response.

6. The network node of claim 1, wherein the instructions that, when executed by the processor, further configure the network node to perform: generating at least one of a proof of work or a proof of stake.

7. The network node of claim 1, wherein the instructions that, when executed by the processor, further configure the network node to perform: receiving a confirmation from at least one validator node in the committee indicating that the network node as been selected for new membership in the committee.

8. The network node of claim 7, wherein the confirmation is digitally signed using a multi-signature from validator nodes in the committee.

9. A non-transitory computer readable medium storing instructions that, when executed by executed by a processor of a network node in a network comprising a committee of validator nodes and at least one client node, configure the network node to perform the following steps of a reconfiguration process for reconfiguring the membership of validator nodes in the committee, the steps comprising:
   in a first stage of the reconfiguration process:
      transmitting to the committee of validator nodes a request to become a new validator node in the committee;
      receiving a response from at least one validator node in the committee confirming that the network node has been selected to become a new validator node in the committee; and
   in a second stage of the reconfiguration process:
      generating a request for data confirming the network node is the new validator node;
      receiving the data, wherein the data indicates that at least a threshold number of validator nodes have confirmed that the network node is selected to be the new validator node; and
   coordinating with the other validator nodes in the committee to process a transaction received from the client node in the network.

10. The computer readable medium of claim 9, wherein the transaction received from the client node contains transaction data and the validator nodes in the committee process the transaction data to form a new block to be added to a TransactionBlock blockchain.

11. The computer readable medium of claim 9, wherein public key information for at least one of the validator nodes in the committee is stored in a current block of a KeyBlock blockchain.

12. The computer readable medium of claim 9, wherein the instructions that, when executed by the processor, further configure the network node to perform: coordinating with the other validator nodes in the committee to add a new block to a KeyBlock blockchain, the new block corresponding to the committee including the network node.

13. The computer readable medium of claim 9, wherein the identity of at least one validator node in the committee is unknown to the network node before the network node receives the response.

14. The computer readable medium of claim 9, wherein the instructions that, when executed by the processor, further configure the network node to perform: generating at least one of a proof of work or a proof of stake.

15. The computer readable medium of claim 9, wherein the instructions that, when executed by the processor, further configure the network node to perform: receiving a confirmation from at least one validator node in the committee indicating that the network node has been selected for new membership in the committee.

16. The computer readable medium of claim 9, wherein the confirmation is digitally signed using a multi-signature from validator nodes in the committee.

17. A method for managing a network node in a network comprising a committee of validator nodes and at least one client node, the method comprising:
   in a first stage of a reconfiguration process for reconfiguring the membership of validator nodes in the committee:
      transmitting to the committee of validator nodes a request to become a new validator node in the committee;
      receiving a response from at least one validator node in the committee confirming that the network node has been selected to become a new validator node in the committee; and
   in a second stage of the reconfiguration process for reconfiguring the membership of validator nodes in the committee:

generating a request for data confirming the network node is the new validator node;

receiving the data, wherein the data indicates that at least a threshold number of validator nodes have confirmed that the network node is selected to be the new validator node; and coordinating with the other validator nodes in the committee to process a transaction received from the client node in the network.

18. The method of claim 17, wherein the transaction received from the client node contains transaction data and the validator nodes in the committee process the transaction data to form a new block to be added to a TransactionBlock blockchain.

19. The method of claim 17, wherein public key information for at least one of the validator nodes in the committee is stored in a current block of a KeyBlock blockchain.

20. The method of claim 17, wherein the instructions that, when executed by the processor, further configure the network node to perform: coordinating with the other validator nodes in the committee to add a new block to a KeyBlock blockchain, the new block corresponding to the committee including the network node.

* * * * *